(12) United States Patent
Mollick

(10) Patent No.: US 12,137,626 B2
(45) Date of Patent: Nov. 12, 2024

(54) THREE-POINT HITCH WITH ATTACHABLE IMPLEMENT-ACTUATORS

(71) Applicant: Peter J. Mollick, Phoenix, AZ (US)

(72) Inventor: Peter J. Mollick, Phoenix, AZ (US)

( * ) Notice: Subject to any disclaimer, the term of this patent is extended or adjusted under 35 U.S.C. 154(b) by 421 days.

(21) Appl. No.: 17/777,043

(22) PCT Filed: Nov. 30, 2020

(86) PCT No.: PCT/US2020/062562
§ 371 (c)(1),
(2) Date: May 15, 2022

(87) PCT Pub. No.: WO2021/113165
PCT Pub. Date: Jun. 10, 2021

(65) Prior Publication Data
US 2022/0400600 A1   Dec. 22, 2022

Related U.S. Application Data

(60) Provisional application No. 62/995,485, filed on Jan. 29, 2020, provisional application No. 62/974,561, (Continued)

(51) Int. Cl.
*A01B 59/00* (2006.01)
*A01B 59/06* (2006.01)
(Continued)

(52) U.S. Cl.
CPC .......... *A01B 79/005* (2013.01); *A01B 59/004* (2013.01); *A01B 59/068* (2013.01);
(Continued)

(58) Field of Classification Search
CPC ................ A01B 79/005; A01B 59/004; A01B 59/043; A01B 59/068; A01B 63/023;
(Continued)

(56) References Cited

U.S. PATENT DOCUMENTS

| | | | | |
|---|---|---|---|---|
| 2,673,508 A | * | 3/1954 | Richey | A01B 59/065 |
| | | | | 172/476 |
| 4,778,194 A | * | 10/1988 | Koch | F16C 7/06 |
| | | | | 403/46 |
| 4,930,581 A | | 6/1990 | Fleischer | |
| 6,257,347 B1 | | 7/2001 | Campisi | |
| 6,609,575 B1 | * | 8/2003 | Crabb | B60D 1/141 |
| | | | | 280/491.2 |

(Continued)

FOREIGN PATENT DOCUMENTS

WO   WO-2016041547 A1 * 3/2016 ......... A01B 59/0415

*Primary Examiner* — Jamie L McGowan

(57) ABSTRACT

A conventional three point hitch of an agricultural tractor for the connection and use of working implements cultivating or excavating the earth and other duties involved in the industry of farming or grading excavation is modified by adding extending and retracting implement-actuators attachable to the existing bottom-lift-arms, therefore supplanting, but still using the existing bottom-lift-arms on the three-point hitch. The implement-actuators assist the implement in correcting the implements centerline when the tractor centerline is off a predetermined centerline path. In addition, the extending of the implement-actuators proportionally, inversely and simultaneously can correct the pivot point of the implement to match the pivot point of the tractor while the tractor performs turns during the working use of the implement.

28 Claims, 24 Drawing Sheets

Related U.S. Application Data filed on Dec. 10, 2019, provisional application No. 62/974,404, filed on Dec. 5, 2019.

(51) Int. Cl.
| | |
|---|---|
| *A01B 63/02* | (2006.01) |
| *A01B 63/108* | (2006.01) |
| *A01B 63/12* | (2006.01) |
| *A01B 69/04* | (2006.01) |
| *A01B 69/08* | (2006.01) |
| *A01B 79/00* | (2006.01) |

(52) U.S. Cl.
CPC .......... *A01B 63/023* (2013.01); *A01B 63/108* (2013.01); *A01B 63/12* (2013.01); *A01B 69/006* (2013.01); *A01B 69/008* (2013.01)

(58) Field of Classification Search
CPC ..... A01B 63/108; A01B 63/12; A01B 69/006; A01B 69/008
See application file for complete search history.

(56) References Cited

U.S. PATENT DOCUMENTS

| | | | |
|---|---|---|---|
| 7,048,071 B1* | 5/2006 | Huenink | A01B 59/004 |
| | | | 403/46 |
| 2002/0043379 A1* | 4/2002 | Kusters | A01B 61/02 |
| | | | 172/272 |
| 2003/0217852 A1 | 11/2003 | Bernhardt | |
| 2009/0272550 A1 | 11/2009 | Mozingo | |
| 2021/0212249 A1* | 7/2021 | Disberger | A01B 59/06 |
| 2024/0306530 A1* | 9/2024 | Disberger | A01B 69/008 |

* cited by examiner

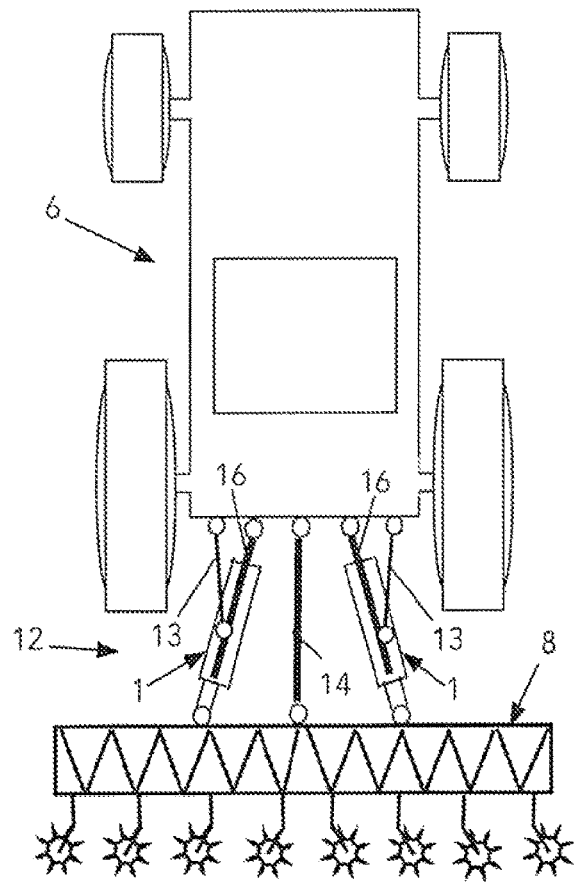
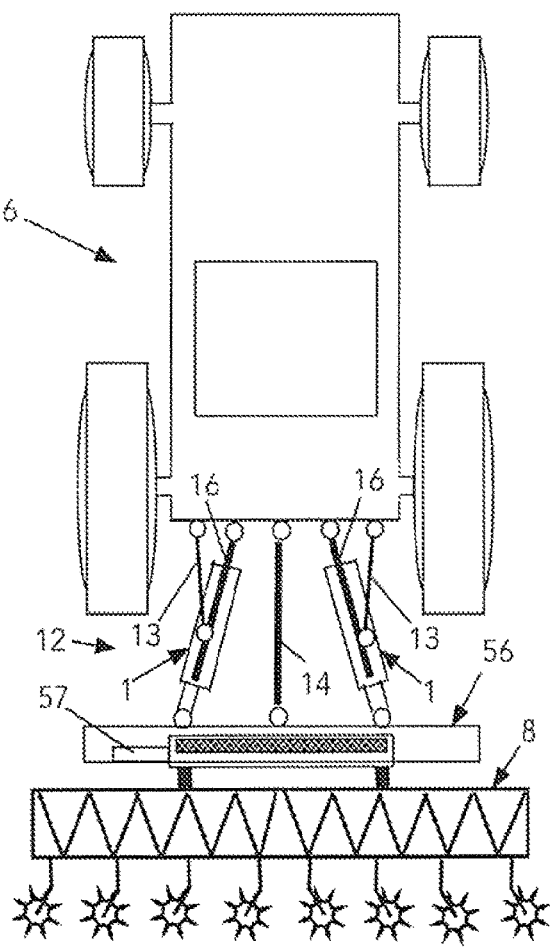
Fig. 8
Fig. 9

THREE-POINT HITCH WITH ATTACHABLE IMPLEMENT-ACTUATORS

CROSS-REFERENCE TO RELATED APPLICATIONS

This application claims the benefit of U.S. Provisional Patent Application No. 62/995,485 titled "Three-Point Hitch with Extending/Retracting Bottom-lift-arms" filed Jan. 29, 2020 and U.S. Provisional Patent Application No. 62/974,561 titled "Three-Point Hitch with Extending/Retracting Bottom-lift-arm Actuators" filed Dec. 10, 2019 and U.S. Provisional Patent Application No. 62/974,404 titled "Three-point hitch with extending bottom-lift-arms" filed Dec. 5, 2019, the contents of which are incorporated herein by reference in their entirety.

BACKGROUND OF THE INVENTION

Mobile machinery such as agricultural tractors, bulldozers, track tractors, skip loaders, all-terrain vehicles and earth grading tractors, generally referred to as a "tractor," typically are provided with a suitable power plant, a source of fluid under pressure and or a source of electric current. The fluid pressure source includes suitable valve control means. The tractors typically include an implement mounting system known as a three-point hitch. The three-point hitch includes a pair of opposed laterally spaced apart bottom-lift-arms in a horizontal plane and located at the rear or the front of the tractor body or frame and rotatably connected to the tractor with pivotal ball joints which are affixed to the frame or body of the tractor at a selected distance of typically 12 to 30 inches above the ground and extend on each side of a center draw bar. The free distal ends of the bottom-lift-arms typically include a pivotal ball rotatable in a socket with an axial hole extending there through that acts as an implement-connection-device. The bottom-lift-arms lift the attached implement and the top-link-arm holds the implement in place in a vertical plane. Most of the weight of the attached implement is supported by the bottom-lift-arms.

A third arm, called a top-link arm, is also rotatably connected with a socket and ball joint to the tractor frame at a point about 30 to 60 inches above ground and centered above the bottom-link arms. The top-link-arm attached in a higher horizontal plane of the tractor and located in a vertical plane centered between the two bottom-lift-arms. The free distal end of the top-link arm is fitted with a pivotal rotatable ball with an axial hole extending there through that acts as an implement-connection-device for connecting to a center point on an implement. Free ends of the two bottom-link arms and the top-link arm provide three-points of attachment to implements and therefore is referred to as a three-point hitch. The length of top-link arm is generally adjustable by means of a built in turn-buckle assembly. This provides for manual forward to backwards tilting of the connected implement. The top-link arm turn buckle assembly can be replaced with a hydraulic actuator for quick controlled manual or automated adjustments of the length of the top-link arm resulting in adjustments of the attached three-point implement. each of the three arms pivotally attached to the tractor at one end, the opposing end of each of the three arms comprising an implement-connection-device configured to connect to the implement, the first and the second bottom-lift-arms laterally spaced apart and attached in a lower horizontal plane of the tractor, the top-link-arm attached in a higher horizontal plane of the tractor and located in a vertical plane between the two bottom-lift-arms.

Each bottom-lift-arm is connected to a lift-link-arm that is connected to an upper-lift-arm that is connected to an upper-lift-arm actuator to provide a means for lifting such as a suitable power lift mechanism, for example one or more hydraulic actuators. This provides the capability to raise and lower the two bottom-link arms and thus the implement that is connected to the three-point hitch. Because the free ends of all three arms are connected to the tractor with ball joint type connections, all three arms may freely pivot to the left and the right any time the three-point hitch has the implement raised off the ground. On older tractors, an additional bar called a stabilizer arm is provided, if desired, and is connected to one of the first two bottom-lift-arms and to a fixed point on the tractor. On newer tractors, two stabilizer arms are provided, one for each bottom-lift-arm and they are also connected to a fixed point on the tractor, in addition on some newer tractors such as larger John Deere Co. tractors, the stabilizer arms are replaced with spacers the bottom-lift-arms slide against. The stabilizer arms allow the bottom-lift-arms to still be raised and lowered by hydraulic means, but the implement is held stable with reference to the horizontal plane, and cannot swing to and fro as before.

In summary of a three-point hitch:
two bottom-lift-arms pivotally connected to a lower point on the tractor;
each bottom-lift-arm pivotally connected to a corresponding lift-link-arm;
each of the two lift-link-arms pivotally connected to a corresponding upper-lift-arm;
each of the two upper-lift-arms connected to and being raised and lowered by at least one upper-lift-arm single action actuator;
one top-link-arm pivotally connected to an elevated point on the tractor;
two stabilizer arms stabilizing the lateral pivoting movement of the bottom-lift-arms;
each stabilizer arm adjustably connected to a bottom-lift-arm and connected to a lower point on the tractor;
provided on some newer John Deere tractors, stabilizing plates replace the stabilizer arms, the plates rubbing against and limiting the lateral movement of the bottom-lift-arms;
the bottom-lift-arms capable of being pivotally connected to two lower points of the implement; and
the top-link-arm capable of being pivotally connected to an upper point on the implement.

The attached implement can include a transversely extending tool bar or frame member having laterally spaced apart hardware plates extending towards the tractor and attached to the implement, the plates comprising a heavy pin between the plates inserted in holes in the plates for removable attachment to the three-point hitch pivotal ball and sockets held within the distal ends of the bottom-lift-arms. In addition to the bottom-lift-arm attachment hardware means on the implement is an upper attachment hardware means for the attachment of the top-link arm to the implement. Many end users of the three-point hitch now use hooks as attachment to the pin between the hardware plates, the hooks fitted with latching devices on the bottom-lift-arms and just a hook for the top-link connection.

A three-point hitch is standard equipment on most agricultural and earth grading tractors in use today. The use of a three-point hitch provides lifting, lowering and tilting mechanisms to agricultural implements attached to the hitch, such as a plow or a planter. The tractor three-point hitch allows the attached tool or implement to be raised and lowered, tilted horizontally and tilted vertically, all such movements and adjustments provided by hydraulically activated cylinders or manual crank screw devices. Front three-point hitches, while available and becoming more popular, are less common than rear three-point hitches on agricultural tractors.

The three-point hitch provides for a quick attachment of various implements used on a tractor. In addition, when the implement is in the raised or lowered position, limited lateral movement of the three-point bottom-lift-arms is freely available. To limit lateral movement of the implement in the raised or lowered position, the user can use the stabilizer arms comprising a longitudinal member having a selected adjustable length attachable to a swing arm attachment point on the tractor body or frame with the opposing end attaching to the bottom-lift-arms to limit the lateral movement of the arms. Most tractor brands are factory supplied with three-point hitch bottom-lift-arm stabilizer arms. Controlled lateral movement of an attached implement is usually not provided with a three-point hitch, although restricted lateral movement of the hitch is usually available and provided using the bottom-lift-arm stabilizer arms. In some situations, the tractor operator will allow a minimal sway of the three-point hitch bottom-lift-arms to allow the implement to move laterally slightly when using a deep tilling implement such as a plow that does not require implement guidance. When implements are used in a guided scenario such as GPS guidance, and the guidance required is more exact in positioning, the sway of the three-point hitch is limited to minimal. A three-point hitch on a tractor has a V design in the positioning of the bottom-lift-arms between the tractor and the implement, narrower at the tractor connection and wider at the implement connection, therefore, uncontrolled sway of the bottom-lift-arms causes a pivoting action of the implement pivoting where the bottom-lift-arms attach to the tractor. When swaying of the bottom-lift-arms occur, the lift-link-arms that are attached to the bottom-lift-arms will move to the left or the right at the bottom-lift arm connection, but will not move to the left or the right at the top-lift-arm connection, resulting in slightly lifting or lowering of each bottom-lift-arm depending on the angle and position of the V shape of the bottom-lift-arms in the sway position, this lifting of one bottom-lift-arm and the lowering of the other bottom-lift arm will affect the level and plumb positions of the implement usually causing an unintended consequence to the implement performance that is undesirable. Therefore, while using an implement in a guided scenario such as GPS guidance, the sway of the three-point hitch is usually limited to minimal. The disclosed invention is directed towards guided implements or a controlled positioning of the implement in a twisting pivoting movement on a vertical axis that adjusts the centerline of the implement using extending and retracting bottom-lift-arms.

As stated earlier, normally in a guided implement scenario, implements attached on a three-point hitch of a tractor are attached with limited lateral sway or no lateral sway at all. Too much lateral sway of an implement would leave the implement out of control in some situations and not able to be reliably positioned where intended. The three-point hitch attachment is a sturdy and rigid attachment that also enables the tractor to lift the entire implement entirely off of the ground surface. The forward to rear lengthwise centerline of the implement will align with the forward to rear lengthwise centerline of the tractor on a basic three-point hitch mounted on a tractor when the sway of the hitch is minimal, resulting in one centerline aligning with the tractor and the implement.

While operating a tractor and a three-point attached implement with minimal sway of the three-point hitch bottom-lift-arms, and the tractor operator points the centerline of the tractor in a particular direction, he or she is certain the implement centerline will stay aligned with the tractor centerline, both centerlines aligning parallel and end to end representing one centerline. This centerline relationship works very well while the tractor is traveling in a straight line and the tractor centerline is aligned with the crop centerline. Problems will occur when the tractor centerline accidentally moves off course of the crop centerline causing the implement centerline to also move off course of the crop centerline resulting in damaged or destroyed crops while the tractor is moving implements between the crop rows.

Once the tractor and the implement centerlines are off of the crop centerline, tractor steering corrections must be made to correct the tractor and the implement centerlines back in line with the crop centerline. In a scenario where a tractor has veered off to the right of the crop centerline, the tractor and the implement are now to the right side of the crop centerline and starting to damage crops with the implement, steering corrections must now be made. When the tractor with front wheel steering, turns the front wheels to the left, the tractor will pivot at the rear axle of the tractor and the tractor centerline will also turn to the left, resulting in the centerline at the front of the tractor leaning to the left and the centerline at the rear of and behind the tractor is now kicked out to the right. Since usually the working implement is attached to the rear three-point hitch of the tractor and sticks out of the rear of the tractor, the implement is now also kicked out to the right further than when the tractor was initially off course and not yet making the steering adjustments to get back on the predetermined path and centerline of the crops. Now the implement is damaging more crops than is was when it was initially off course and the tractor was not yet making steering corrections. The previous solution to this dilemma of tractor steering corrections damaging additional crops was to stop the tractor, lift the three-point hitch and the implement off of the ground, back the tractor up for about forty to fifty feet, go forward making the steering corrections with the implement off of the ground and then lower the implement back to the ground when the tractor and the implement centerline is again aligned with the crop centerline, then continuing on until the next misalignment of the tractor centerline and the crop centerline occurs. Of course the above scenario happens more often to an apprentice tractor operator than to an experienced tractor operator, but many times simple farm hands are operating the tractors and still learning the complicated trade of farming and tractor operation.

The disclosed invention can be used on tractors with various steering systems, although the description in this application is directed to front wheel steering of the tractor as opposed to articulated steering of the tractor whereas the frame of the tractor comprises a center-pivot action of the frame to steer the tractor. Tractors with articulating steering are much less common than front wheel steering tractors in the agricultural industry, although, this disclosed invention can also be easily adopted to use with tractors utilizing articulated steering.

Earth-moving equipment in the construction and farming field has rapidly changed for the better in recent years with the introduction of Global Positioning Systems (GPS) and laser guidance systems. Current GPS guidance systems for earth-moving and agricultural tractors generally are designed to auto-steer the tractor. Much of the guidance involves steering the tractor in a straight line to form a straight road or straight row of crops. These guidance systems work well, but they are not perfect and have deficiencies that occasionally disrupt the performance of the systems such as losing the GPS signal connection or a laser system that is not practical. In addition, the accuracy of the systems can be disrupted by the systems themselves or a base station malfunction. Since most of these systems involve steering the tractor in alignment with the crop centerline, disruption in the systems can cause the tractor to veer off course resulting in crop damage from the implements and then additional crop damage from the steering corrections of the tractor and the implement as the implement moves further off of the crop line while performing steering corrections damaging additional crops. Some of these problems have been partially resolved by placing the GPS receivers on the implement and the allowing the tractor to make quicker steering corrections than previously when only a GPS receiver was mounted on the tractor only. Standard GPS position monitoring systems in the marketplace are configured to:
  a) generate a map of the landscape and store the map in a data memory device for use by a controller; and
  b) generate predetermined path of a tractor or implement or both to follow, and store the generated path in the data memory device for use by the controller.

Several patents teach methods of steering and controlling tractor mounted implement attachment systems to two-point and three-point hitch systems. U.S. Pat. No. 3,208,535 by Fischer teaches an automatic steering system for implements; U.S. Pat. No. 7,530,405 by Kollath et al. teaches a quick coupler mechanism, U.S. Pat. No. 4,019,753 by Kestel teaches an adjustable three-point tractor hitch; U.S. Pat. No. 4,463,811 by Winter teaches an implement with a laterally movable frame structure with limited lateral movement; and U.S. Pat. No. 5,931,234 by Trowbridge teaches a retractable three-point hitch mounted, vertically and laterally adjustable toolbar. U.S. Pat. No. 4,930,581 by Fleischer teaches a guidance control device for agricultural implements using a hydraulic cylinder to pivot the implement frame and implement to the left or to the right to correct lateral position with respect to the tractor and the previously processed rows. U.S. Pat. No. 3,208,535 by Fischer teaches an automatic steering device and a plant stem sensor.

New apparatuses either with a US patent issued or currently offered in the marketplace have been observed that provide a side-shifting-sliding positioning of the implement independently from the position of the tractor, effectively placing the implement position correctly in a predetermined path even if the tractor is off the same predetermined path. Two of these side-shifting-sliding apparatuses appear to handle heavy implements in a side-shifting-sliding positioning of the implement in a predetermined path. One such apparatus is LaForge Systems Dyna-Trac apparatus (WO2018172458) HITCH DEVICE FOR AGRICULTURAL VEHICLE. Another apparatus is Mollick U.S. Pat. No. 10,455,753 SYSTEM FOR CONNECTING IMPLEMENT TO MOBILE MACHINERY. The functions of the side-shifting-sliding apparatuses slide the implement laterally without pivoting the implement centerline out of parallel from the tractor centerline on a vertical axis. The LaForge Systems Dyna-Trac apparatus employs an optional uncontrolled swaying action of the bottom-connections to the implement that is not in a V shape configuration and does not pivot the implement centerline out of parallel from the tractor centerline, this results in a sideways sway of the implement centerline but not a vertical axis turning pivot of the implement centerline.

The above described new apparatuses using a side-shifting-sliding action connected between the three-point hitch and the implement has improved the accuracy of the implement placement. Although these new side-shifting-sliding systems are well received and gaining popularity while also improving crop yields, the side-shifting-sliding systems still have retained the problem of the implement centerline maintaining a parallel alignment to the centerline alignment of the tractor at all positions, thus, the implement centerline not aligning with the crop centerline during tractor steering corrections, the result being damaged crops, but far less damaged crops than the time period before the current side-shifting-sliding apparatuses, but still damaged crops, and exacerbated damaged crops in some situations with long rearward extending implements.

The tractor centerline will always align in parallel with the implement centerline in a three-point hitch attached implement system assuming the bottom-lift-arms of the three-point hitch are of equal length and attached equally on the implement, and the sway of the three-point hitch is minimal as is normal in most guided implement scenarios. In the event the tractor or the implement are fitted with a single GPS receiver between the tractor and the implement in a GPS guidance system, and even if the GPS receiver is on point with the predetermined path that represents the crop centerline, the alignment of the implement centerline with the crop centerline will be difficult if not impossible to determine unless there is another GPS receiver mounted on the tractor or on the implement in a linear front to rear configuration of the two receivers. The single GPS receiver will not detect if the implement and the tractor are pivoted off parallel with the crop centerline.

In a GPS guided implement system and in order to detect and determine if the tractor or the implement centerline is on point with and aligned parallel with the crop centerline, two GPS receivers are required to be located at two linear separate points aligned with the tractor or the implement centerlines or both.

Examples are:
  a) one GPS receiver on the tractor and one GPS receiver on the implement, both receivers aligned with the tractor and implement centerlines, or
  b) two GPS receivers on the implement spaced apart front to rear and aligned with the implement centerline, or
  c) two GPS receivers on the tractor spaced apart front to rear and aligned with the tractor centerline.

Any one of the above scenarios a), b), or c) will allow the controller in the guidance system to align the tractor or the implement GPS receivers with the crop centerline while also aligning the tractor centerline and the implement centerline in parallel with the crop centerline. Then, if a side-shifting-sliding apparatus is also used to position the implement in a lateral direction to position the implement on the crop centerline, the tractor centerline alignment can still be aligned in parallel with the implement centerline using a controller to control the implement and the tractor positions. As long as the tractor centerline and the implement centerline are parallel, the two centerlines do not need to be inline with each other, meaning the tractor centerline can be to the left or the right of the implement and the crop centerlines without the implement damaging the crops.

The conventional three-point hitch parallel and non-yielding relationship of the tractor centerline and the implement centerline becomes problematic when the tractor is making steering adjustments if and when the tractor centerline veers from the crop centerline and even is a side-shifting implement attachment apparatus is used to laterally position the implement. If the tractor centerline is not parallel with the crop centerline, the implement centerline is not parallel with the crop centerline, since the two are rigidly connected through the three-point hitch, resulting in a situation wherein the implement centerline is twisted or turned off of the crop centerline even if the implement GPS receiver is on-point with the crop centerline. When an implement is centered on the crop centerline but the implement centerline is not parallel with the crop centerline, an implement such as a planter and fertilizer combination implement may be inadvertently used in a slightly diagonal manner and not in a straight manner with the crop centerline, the implement will be steered off of the predetermined path of the implement as forward progress of the implement and the tractor occurs, this situation is exacerbated when a long implement is servicing many rows such as in a four or eight row planting and fertilizing setup, the crop damage or misplacement of seed and fertilizer will multiply when using large implements.

Considering the above paragraph, when the guidance system detects that the tractor and the implement centerlines are not parallel in alignment with the crop centerline during tractor steering corrections, there is little that can be done to correct the situation, except waiting while the in motion tractor steering corrections align the tractor and the implement centerlines with the crop centerline, this situation also occurs even when using a side-shifting-sliding apparatus laterally moving the implement in position. The re-alignment of the tractor and the implement centerlines with the crop centerline could take up to fifty feet or more of tractor and implement travel during steering corrections. The conventional three-point hitch locks the tractor and the implement centerlines in a parallel relationship even when the centerlines are not aligned with each other in the same line end to end such as when also using the side-shifting-sliding apparatus connected between the three-point hitch and the implement.

In summary, even though the side-shifting-sliding apparatuses have improved the alignments of implements to the crop center line using a guidance system for control, the problem still remains of the implement centerline not being aligned in parallel with the crop centerline during tractor steering corrections even if the center of the implement is placed on the point of the crop centerline using a side-shifting-sliding apparatus. The side shifting-sliding apparatus comprises a first frame representing the position of the tractor and a slidable second frame representing the position of the implement. Even while using the side shifting-sliding apparatus for lateral positioning of the implement, if the tractor centerline is not parallel in alignment with the crop centerline, then the implement centerline will not be parallel in alignment with the crop centerline, usually resulting in damaged crops.

SUMMARY OF THE INVENTION

The disclosed solution to the misalignment of the implement centerline with the crop centerline during steering corrections of the tractor is to realign the implement centerline with the crop centerline by pivoting the implement on a vertical axis at the implement lateral center point using extending and retracting dual action linear actuators attached along the three-point hitch bottom-lift-arms. Each linear actuator comprises a cylinder and a rod that extends and retracts to and from the cylinder. The dual action linear actuators are referred to as "implement-actuators" in this Patent Application. A dual action implement-actuator applies force in both directions. Each implement-actuator being attached along each three-point hitch bottom-lift-arm and then pivotally connected to the two bottom connection points of the implement, therefore, acting in place of the bottom-lift-arms but not replacing the bottom-lift-arms, the bottom-lift-arms of the three-point hitch are used as a mounting base for the implement-actuators. Each implement-actuator comprises a rod-implement-connection-device on one end of the rod therefore supplanting the implement-connection-device of each three-point hitch bottom-lift-arms. The rod-implement-connection-device of the implement-actuators acts in place of the implement-connection-device of the bottom-lift-arms. The top-link arm is sequentially connected between the tractor and the upper connection point to the implement. The implement-actuators are typically provided with power, controllable and used in an automated operated system with power controls or instruments, or they can also be used in a manually adjustable non-powered system such as hand positioning a grading blade to a particular degrees off of center. If the implement-actuators are extended and retracted simultaneously, inversely and proportionally with each other resulting in a pivoting of the implement on a vertical axis, the top-link arm can remain at a constant length while maintaining the implement at a generally level and plumb position as long as the implement was generally level and plumb when initially connected to the implement-actuator rods, the implement-actuator rods starting at an equal extension length and the rods positioned at a neutral-point of their extension. The neutral-point of extension of the rods reflecting a position wherein the rods are extended to a point of fifty percent of the usable extension length of the rods.

Using the implement-actuators in combination with the tractor three-point hitch and the implement allows the centerline of the implement to be pivoted out of parallel from the tractor centerline. The advantage to pivoting the implement centerline out of parallel from the tractor centerline is that during the tractor steering corrections after the tractor veers from a predetermined path and after the tractor centerline veers from the crop centerline parallel relationship, the implement centerline can be pivoted back to parallel with the crop centerline while the tractor centerline is still out of parallel with the crop centerline. This scenario allows a side-shifting-sliding apparatus attached between the tractor three-point hitch and the implement to monitor and reposition the implement laterally while the implement-actuators realign in parallel the implement centerline with the crop centerline while the tractor is performing steering corrections, resulting in the implement centerline maintaining an on point and parallel aligned position with the crop centerline while the tractor steering is correcting the tractor centerline back on point and parallel with the crop centerline, resulting in none or few damaged crops. Alternately, the implement-actuators can be used by themselves as a pair on the three-point hitch to attach an implement such as a grading blade that can be pivoted for various dirt work operations, or the implement-actuators can be used for any other purpose where the three-point hitch attached implement usage can be improved with the ability to pivot and turn the implement on a vertical axis, such as the implement following an arching line of the tractor when the tractor navigates a turn.

The disclosed invention modifies a conventional three-point hitch resulting in an enabled controllable vertical axis pivoting movement of the implement that can be combined with a side-shifting-sliding apparatus to keep the implement centerline aligned with the crop centerline while the tractor centerline is off of the crop centerline and off of its predetermined path while the tractor is adjusting its steering to re-align itself back on its predetermined path. A typical system using the disclosed invention comprises a tractor with the disclosed three-point hitch, and an implement attached to the three-point hitch. In addition, a side-shifting-sliding implement connection device can be installed between the three-point hitch and the implement to allow for controlled side-shifting of the implement.

When using the implement-actuators and an automated guidance system to control the position and centerline alignment of the implement compared to the centerline of the crops, there are multiple ways to achieve the task using signal receivers, sensors and a controller. A simpler method is to mount two signal receivers on the implement and two signal receivers on the tractor. A pair of signal receivers being longitudinal aligned with the centerline of the tractor and a pair of signal receivers being longitudinal aligned with the centerline of the implement, each signal receiver in each pair being spaced apart enough to determine the pivotal position of the implement and the tractor centerlines as compared to the crop centerline. In a laser guided guidance system the receivers of each pair of signal receivers would need to be located on a different horizontal plane to allow for the reception of the near horizontal laser signal received by the receivers. In a GPS guided guidance system, the height of each signal receiver would not affect the reception of the signals unless a base station requires the signal receivers to be located at different heights, therefore the signal receivers could be mounted at the same height as each other.

In the alternative, for separately determining and controlling the direction of the tractor centerline and the implement centerline as compared to the crop centerline, two signal receivers can be mounted on either the tractor or two signal receivers mounted on the implement in a front to rear linear direction and spaced apart enough to be detected or receive signals from a transmitter, and in addition, sensors mounted on each implement-actuator to determine the extension or retraction length of each implement-actuator to form a relationship between each implement-actuator to enable a pivoted relationship between the tractor centerline and the implement centerline to be measured. Once the pivoted relationship between the tractor centerline and the implement centerline is measured and known, the controller can adjust the tractor centerline direction and the implement centerline direction separately and accurately to align with the crop centerline in a parallel alignment, and in addition, a side-shifting-sliding apparatus can also be used in the configuration, using sensors to determine the a framework position as compared to a second sliding framework position to determine the tractor position as compared to the implement position as a lateral measurement. The tractor can be steered automatically using the controller and an auto-steering device mounted on the tractor. The auto steering devices either turning the steering wheel, or in a more advanced steering system, the hydraulic powered steering gear box being controlled by the controller, therefore steering the tractor.

During a turning radius of a front wheel steered tractor and wherein the front axle is rigid and non-pivoting (some New Holland brand tractors use a pivoting axle to decrease the turning radius of the tractor), the centerline of the tractor will pivot at a pivot-point on a line extended perpendicular to the front to rear centerline of the tractor, this is the line extending in the direction of the turn and aligned lengthwise, parallel to, and inline with the rear axle of the tractor, this line referred to as the "rear-axle-aligned-line". The pivot-point on the rear-axle-aligned-line is the point that another line intersects from an average of the degrees of pivot of the right front wheel and the left front wheel, and this line will mark on the center of the front axle for the purpose of pivoting the implements at their center-point assuming the implements center-points are aligned with the center-point of the tractors front and rear axles representing the tractor centerline. The front-axle-angle-line, is the line extending from the center of the front axle and referred as the "front-axle-angle-line".

Further in addition to the above scenario of the implement centerline being aligned with the crop centerline while the tractor centerline is misaligned with the crop centerline, the implement-actuators can also be used to pivot the implement on a vertical axis while the tractor is performing intended turning directions of the tractor such as navigating turns on a crop centerline that is not in a straight line, or while performing excavating or cultivating of a dirt surface while performing intended turns of the tractor. As mentioned previously, a conventional three-point hitch is attached between the tractor and the implement creating a rigid and non-yielding relationship between the tractor and the implement causing the tractor centerline and the implement centerline to remain parallel at all times, this is true even if a side-shifting apparatus is positioned between the tractor and the implement in use. In this scenario, if the tractor and the attached implement is to navigate a turn, the implement will not pivot at the same degrees of pivot as the tractor is pivoting, the tractor pivots on a line perpendicular to the tractor centerline and parallel and aligned with the tractor rear-axle-aligned-line extending from the tractor towards the pivot point of the tractor. The pivot point of the tractor is determined by line that intersects the rear axle line from a point on the front axle between the front wheels of the tractor, the intersecting line extending from the center of the front axle of the tractor. The degree of angle of the line is determined by the average of degrees of turn angle of each of the front wheels of the tractor. The front wheel on the inside of the turn will have a different degrees of turn than the front wheel on the outside of the turn, the difference determined by the spread of the two front wheels and the diameter of the turn. The implement attached to the three-point hitch is positioned at least four feet from the rear axle of the tractor resulting in the implement requiring a degree of pivot to align the implement pivot point with the tractor pivot point.

The degree of pivot to align the implement pivot point to the tractor pivot point can be easily determined by comparing the distance of the implements working center from the tractor rear axle center-point to the distance of the tractor front axle center-point from the tractor rear axle (tractor wheelbase). The comparison will be a percentage comparison between the two measurements of the tractor wheelbase and the implement center-point to the tractor rear axle center-point to determine the percentage of degrees of pivot required by the implement for the implement pivot-point to intersect the tractor pivot-point. For example, if the tractor wheelbase is eight feet and the distance of the implement center-point to the tractor rear axle center-point is six feet, the percentage of the degrees of pivot is equal to seventy five (75) percent (6/8) of the average of the two front wheels pivot degrees. If the average of the two front wheel pivot degrees is twenty (20) degrees, the implement pivot degrees will be fifteen (15) degrees (20*0.75).

In addition, if there is a front three-point hitch with an attached implement, the degree of pivot to align the front mounted implement pivot point to the tractor pivot point can be easily determined by comparing the distance of the front mounted implement center-point from the tractor rear axle center-point to the distance of the tractor front axle from the tractor rear axle (tractor wheelbase). If the front mounted implement center-point extends fourteen (14) feet from the tractor rear axle center-point, the percentage of the degrees of pivot of the front mounted implement is equal to one hundred and seventy five (175) percent (14/8) of the average of the two front wheels angle degrees which represents the front axle center-point turning angle. If the front axle center-point turning angle is twenty (20) degrees, the front mounted implement pivot degrees will be thirty-five (35) degrees (20*1.75).

In the case of navigating turns with three-point attached implements and using the implement-actuators on the three-point hitch, and a tractor with front wheel steering is used, steering degrees sensors can be used to measure the pivot degrees of each front wheel when measured against the centerline of the tractor while the wheels are turned. The inside wheel of the tractor on the turn will have a greater degrees of pivot than the outside wheel, the difference in pivot degrees between the two wheels results from the difference of the circumference of the turn of each wheel, the outside wheel having a larger circumference of the turn resulting in the outside wheel having a smaller degrees of pivot as compared to the inside wheel, a degrees sensor will be installed on each wheel to average the degrees of turn between the two front wheels. The average of the degrees of turn of the two wheels denotes the pivot degrees of the front axle line of the tractor as it intersects with the pivot line of the tractor rear axle creating a pivot point of the tractor. The average of the degrees of turn of the two front wheels can then be used to figure the pivot degrees of the implement center located a line located between the connections of the implement-actuators to the implement. The steering degrees sensors can communicate with the controller to pivot the implement centerline the same number of degrees or any other chosen number of average degrees relative to the pivot degrees of the front wheels of the tractor as compared to the centerline of the tractor. During turns using a three-point attached implement with minimal sway, if the implement centerline is not pivoted on a vertical axis at the center of the implement between the lower two connections of the implement to the three-point hitch to match the pivot point of the tractor, the conventional three-point hitch will cause unintentional stress on the attached implement as the implement takes on side stress caused by the pivot point of the implement not matching the pivot point of the tractor causing the implement to be pushed sideways in addition to being pulled or pushed forward.

In the above scenario of turns, without using the implement-actuators, the three-point attached implement centerline will normally be aligned and parallel with the tractor centerline at all times, the problem arises wherein the implement protrudes out of the front or the rear (usually the rear) of the tractor. The implement while not being located near the pivot point of the tractor prevents the implement from sharing the same pivot point in reference to itself that the tractor shares in reference to itself. The pivot point of the implement not being the same as the pivot point of the tractor causes the implement to move partially sideways while the tractor is in motion and navigating a turn, therefore causing side stresses on the implement that the implement may not be designed to handle. Without using the implement-actuators, the farther the implement pivot point is away from the pivot point of the tractor, the greater the side stress on the implement when the tractor is in motion and navigating a turn.

Optional manual operation of the powered system is easily usable when the two implement-actuators are operated simultaneously, inversely, and proportionally to each other as one retracts and the other extends after both actuators have been set out to a neutral-point in the movement of the actuators. The optional manual operation of the implement-actuators would generally be used in a situation without the need to adjust the top-link arm of the three-point hitch, otherwise an automated controller can be used for automatic adjustments of the implement actuators and the top-link arm to maintain a plumb and level implement or an off-plumb or off-level implement orientation as needed.

Moving the implement-actuators independently of each other and not simultaneously with each other may require a controller controlling other aspects of the three-point hitch such as the top-link-arm if the attached implement is required to maintain a particular plumb or level orientation or a particular off-plumb or off-level orientation. If one implement-actuator is extended and the other implement-actuator is not retracted at an equal length, the implement will not be pivoted on a vertical axis at the horizontal center point of the implement, instead the pivot point will move closer to the end of the implement that was not extended or retracted, therefore tilting the implement and affecting its plumb position if the top-link-arm is not also extended to an new length.

There are multiple options for the attachment location of the implement-actuators to the bottom-lift-arms. The implement-actuators can attach under the bottom-lift-arms or on top of the bottom-lift-arms or two actuators mounted on each bottom-lift-arm with top and bottom mounting locations of the implement-actuators on the bottom-lift-arms, although the preferable mounting location may be under the bottom-lift-arms. Attaching the implement-actuators to the side of the bottom-lift-arms may be problematic for supporting the weight of a heavy implement. If the implement-actuators are attached on the top of the bottom-lift-arms, the connection of the lift-link-arms to the bottom-lift-arms most likely will need to be altered using modified connection hardware preventing the implement actuators from contacting the lift-link-arms. If the implement-actuators are attached underneath the bottom-lift-arms, usually there is clear space for attaching the implement-actuators with no modification to the lift-link-arm connection to the bottom-lift-arm. The bottom-lift-arm implement attachment point is the main attachment and support for the implement-actuator cylinder, in effect, this attachment point bearing most of the weight of the connected implement on the bottom-lift-arm of the three-point hitch. Another point on the implement-actuator cylinder is attached to the bottom-lift-arm closer to the tractor to complete the attachment of the implement-actuator to the bottom-lift-arm unless center attachment points are also needed for stability. The implement-actuators can be used on three-point hitches mounted on the front or the rear of mobile machinery such as on an agricultural tractor or an excavating tractor.

Each implement-actuator rod-implement-connection-device supplants the corresponding bottom-lift-arm implement-connection-device enabling an extending, retracting, and vertical axis pivoting of the attached implement by the implement-actuators. Each implement-actuator configured to enable the rod and the rod-implement-connection-device to handle vertical and lateral loads including downward forces on the rod when the implement-actuators are positioned horizontally in a retracted or extended position of the rod. The implement-actuators allowing additional motion of the implement such as a lengthwise extending or retracting of the implement along the tractor centerline and a horizontal pivoting and twisting motion of the implement. The implement-actuators are typically removable attached to the bottom-lift-arms to allow the tractor operator to remove the implement-actuators to perform duties that do not require the implement-actuators such as plowing.

The conventional bottom-lift-arms of a tractor three-point hitch provide a stable and strong support base for the attachment and support of the implement-actuators, and in addition, the installation or the removal of the implement-actuators from the conventional three-point hitch bottom-lift-arms is a simple process involving the removal of a small amount of hardware and two hydraulic lines for each implement-actuator with a start to finish time for either the installation or the removal of about twenty minutes for the two implement-actuators by an experienced tractor operator.

The implement-actuators comprise a cylinder tube and a rod that extends and retracts into the cylinder. In one configuration and possible the preferred configuration, the actuator style can be a double-ended rod actuator with a rod end protruding out of each end of the cylinder, otherwise a single-ended rod configuration may be used in the design of the actuator using a longer reinforced cylinder, although the double ended rod configuration appears to possibly be the best design for the strength and durability of the implement-actuators, particularly the support of the rod. One end of each implement-actuator rod attaches to the implement to allow the implement-actuator to pivot the implement on a vertical axis, causing the implement to pivot at or near the lateral center of the implement. Pivoting the implement near the lateral center of the implement causes a turning or twisting action to the implement, but the pivot does not generally move the center of the implement laterally across in position, therefore, when used, a side-shifting-sliding apparatus is used for the lateral movements of the implement, in effect, placing the implement in the predetermined path while the implement-actuators aligns the implement centerline with the crop centerline. The rod can be a double-ended continuous rod, the first rod-end protrudes out of the first cylinder-end in an extending motion and the second rod-end protrudes out of the second cylinder-end in an extending motion, the first rod-end and the second rod-end extends and retracts inversely to each other, the second rod-end extends away from the cylinder in the direction of the tractor and retracts towards the cylinder. The second cylinder-end can be attached along the corresponding bottom-lift-arm towards the tractor, the first cylinder-end can be unattached and supported by the rod, the rod being supported by a first sleeve and a bearing, the first sleeve and the bearing surrounding the rod, the first sleeve attached to the corresponding bottom-lift-arm implement-connection-device. The second cylinder-end can be unattached and supported by the rod, the first cylinder-end is unattached and supported by the rod, the first rod-end being supported by a first sleeve and a bearing, the first sleeve and the bearing surrounding the rod, the first sleeve attached to the corresponding bottom-lift-arm implement-connection-device, the second rod-end being supported by a second sleeve and a bearing, the second sleeve and the bearing surrounding the rod, the second sleeve attached along the corresponding bottom-lift-arm towards the tractor. The implement-actuators on the three-point hitch can be configured to operate individually from each other with or without a controller controlling the extension and retraction of the actuators. The implement actuators can be very useful in hooking up implements to the three-point hitch when you need to operate each implement-actuator separately and independently from each other for obtaining the right alignment to the implement to attach the implement to the three-point hitch.

The implement-actuators in the disclosed invention are linear actuators that are designed to handle very heavy side load stress and side load weight bearing. Since the bottom-lift-arms of a three-point hitch are usually near horizontal in position, the side load stress and weight bearing on the bottom-lift-arms would be downward or sideways in direction, thus the side load stress and weight bearing on the implement-actuator would also be downward or sideways in direction. The design of the disclosed invention implement-actuators can be of different configurations to achieve resistance to side loads on the implement-actuator rod. One configuration of the implement-actuators enabling the implement-actuators to resist side loads as mentioned in previous paragraphs is the double-ended rod configuration. The double-ended rod configuration gives support to the rod at each end of the linear actuator cylinder resulting in a wide spread of support to the rod creating a stable base to hold the rod in position and also resist bending of the rod. In the double-ended rod configuration, the support for the rod is at each end of the linear actuator cylinder using slide bearings wherein the rod slides through each slide bearing, the slide bearings surround the rod and the cylinder floats between the slide bearings. At least one implement-actuator attached to the each bottom-lift-arm, each implement-actuator, each implement-actuator comprising:

i. a dual action linear actuator having a cylinder tube and a rod, the cylinder having a first cylinder-end and a second cylinder-end, the rod having a first rod-end and a second rod-end, the first rod-end protrudes out of the first cylinder-end, the first rod-end comprises a rod-implement-connection-device, the rod-implement-connection-device configured to releasably connect to the implement, the rod-implement-connection-device supplants the implement-connection-device of the corresponding bottom-lift-arm;

ii. the first rod-end extends away from the cylinder in the direction of the implement and retracts towards the cylinder;

iii. the first cylinder-end is located proximate to the rod-implement-connection-device, and a second cylinder-end is at the opposing end of the cylinder;

iv. each rod-implement-connection-device enables a pivotal connection to the implement; and v. each implement-actuator is suitable to be controlled with a power source.

There can be different configurations of the implement-actuator using the double-ended rod linear actuator. One configuration herein called an internal slide bearing configuration wherein the slide bearings are located inside the linear actuator cylinder, the slide bearings mounting base and the cylinder would be constructed of a much heavier and sturdier structure than a conventional hydraulic linear actuator that is not built to handle side load stresses. Most conventional hydraulic linear actuators are designed to handle push-pull linear stresses only. If the slide bearings are located outside of the cylinder and the slide bearings supporting the double-ended rod are rigidly supported such as with an additional heavy wall enclosure that surrounds the entire implement-actuator cylinder, or if the slide bearings are supported rigidly and unyielding in another manner, a conventional hydraulic or electric linear actuator can be used and mounted between the two slide bearing causing the entire conventional linear actuator to be entirely supported by the slide bearings at two locations on the rod. This configuration would allow the linear actuator double-rod end cylinder to float between the slide bearings without side load stress on the cylinder since the double-ended rod of the actuator is handling the side load stress and the double-ended rod is being supported by the two slide bearings mounted outside of the linear actuator cylinder at the ends of the linear actuator cylinder. Each implement-actuator should be configured to enable the rod and the rod-implement-connection-device to support substantial downward and side loads on the rod when the implement-actuators are positioned generally horizontal.

There have been attempts and patents issued for extending and retracting bottom-lift-arms on a three point hitch, but these attempts have so far failed to become popular in the marketplace for a variety of reasons. One reason the applicant believes for the lack of success in introducing a three-point hitch with extending and retracting bottom lift arms into the marketplace is the failure to leave the conventional, rigid bottom lift arms in place on the three-point hitch to support the independent implement-actuators to connect to the implement for the improved pivoting motion of the implement. Using a conventional hydraulic or electric actuator to totally replace a conventional bottom-lift arm of the three-point hitch causes a severe limitation of the weight that the three-point hitch can lift and operate with. Conventional linear actuators lack the side-load force resistance required to lift heavy implements. Since the bottom-lift-arms are mounted horizontally on the tractor, the side load force on the bottom-lift-arms would be a downward and a horizontal force on the actuator. Conventional hydraulic and electric actuators using a cylinder tube and a rod are built to exert great extending and retracting forces, but exerting great force to the side of the rod when the rod is extended from the cylinder can damage the rod, the rod bearings and the normal linear alignment of the rod and the cylinder causing a rapid breakdown in the operation and function of the hydraulic or electric linear actuator.

Two known previous attempts to use linear actuators as bottom-lift-arms in the application of a three-point hitch are Wiboltt U.S. Pat. No. 4,125,271 and Tweedy U.S. Pat. No. 3,432,184. Both of these patents teach using a single ended linear actuator as the entire bottom-lift-arm in the three-point hitch configuration apparatus.

Wiboltt appears to suggest using linear actuators as the bottom-lift-arms in the use of lighter implements such as a snowplow as in FIG. 1 and FIG. 2 of the drawings. Wherein in FIG. 3 and FIG. 4 of the drawing it appears these two drawings are representing agricultural uses of the disclosed three-point hitch, and remarkably, these two drawings 3 and 4 do not include a linear actuator in the use of the bottom-lift-arms, instead a rigid, non-telescopic bottom-lift-arm is apparently used. Conversely, snow plows in use today use a single centrally located rigid non-telescoping bottom-lift-arm to lift the plow blade while utilizing two linear actuators to pivot the plow blade in the desired pivoting direction. The linear actuators of the snowplow are not supporting the plow blade in the lifting functions. An example of a snowplow attachment for a vehicle can be seen in Markwardt U.S. Pat. No. 3,201,878.

Tweedy also appears to suggest using linear actuators as the bottom-lift-arms of the three-point hitch apparatus. These bottom-lift-arms in the hitch appear to be electric linear actuators. The top-link attachment to the tractor portion of the hitch appears to be two top-link points suggesting this is a four-point hitch at the tractor location and a three-point attachment at the implement even though there are two top-link-arms attached to the implement at what may be considered a single attachment point. The pivoting of the top-link-arm point on the implement may be problematic with two top-link-arms, a controller may be required if the two top-link-arms do not move equally in linear length in opposite directions.

The disclosed invention in this application has overcome the prior art deficiencies by using a properly configured and properly attached linear actuator for the application of supporting and carrying the heavy weight of a three-point attached agricultural implement. Further more, attaching the properly configured extending and retracting implement-actuators to each existing three-point hitch bottom-lift-arm supports and provides a rigid, non-yielding attachment base for the implement-actuators while also keeping the conventional bottom-lift-arms available for the conventional use of the bottom-lift-arms by removing the implement actuators.

An important feature to the disclosed invention, implement-actuator, is the design of the actuator being a properly supported single-rod-end actuator or a double-rod-end actuator wherein the rod protrudes out of each end of the cylinder at all positions of the rod. Taking advantage of support of the rod at each end of the cylinder provides a large lateral measurement of support to the rod. The double-rod-end actuator design is made possible by attaching the implement-actuator along the existing bottom-lift-arm and not replacing the bottom-lift-arm with the implement-actuator. This design does not require one end of the implement-actuator to be attached to the tractor frame for mounting support, therefore, freeing up space at the tractor-facing end of the cylinder for the rod to exit the cylinder. A further design feature advantage to the disclosed invention is wherein the double-rod-end implement-actuator is able to utilize an external power source such as a hydraulic actuator providing mechanical power to the implement-actuator rod as the rod extends and retracts at the tractor-facing end of the cylinder. Another advantage to the double-rod-end implement-actuator is having the tractor facing end of the rod exposed and available to mount linear position sensors at a location away from the working implement to avoid possible damage to the position sensors. When the hydraulic linear actuator is a single ended linear actuator, the rod protrudes out of one end of the cylinder.

There are a few options available for the type of linear actuators to use for the disclosed invention. Normally a hydraulic or electric linear actuator can be used for the application with different types of each to consider. Although electric actuators as well as hydraulic actuators can be used, examples herein will be shown in the hydraulic versions. Generally there are four choices of actuator types that can be used.

- an altered and improved double-ended-rod linear actuator with heavy internal slide bearings.
- a standard double-ended-rod linear actuator with rod supporting slide bearings mounted outside of the cylinder allowing the actuator to float between the slide bearings.
- a cylinder with slide bearings and an extending and retracting double-ended-rod externally powered by one or two single-ended-rod or double-ended-rod linear actuators forming one actuator with the implement-actuator being mechanically powered by one or two linear actuators.

A properly configured and supported single-ended actuator

A double-ended-rod linear actuator may provide more support to the actuator rod than a single-ended-rod actuator, the double-ended-rod being supported at two ends and having a greater length span of support for the rod than a single-ended-rod. The double-ended-rod linear actuator may be a better choice than the single-ended-rod linear actuator. The standard double-ended-rod linear actuator with added rod supporting slide bearings may be a good option as well as the cylinder with slide bearings and an extending and retracting double-ended-rod powered by one or two single-ended linear actuators forming one actuator with additional rods and cylinders. The hydraulic actuators are dual action actuators providing force in either direction and using either a fluid dividing valve or a series flow configuration of the hydraulic fluid when using double ended rod actuators. The fluid dividing valve feeding equal fluid flow to each actuator in either direction or both in the same direction, and the electric version can use geared and measured actuators with switches. Single ended conventional actuators may not be the preferred choice in this application as they require a fluid-dividing valve for equal movement of the rod in the extending or retracting directions since the fluid chambers are not equal on each side of the internal piston of the actuator.

Double-ended rod hydraulic actuators can be operated in series for an equal extension of a first actuator as opposed to an equal retraction of the second actuator. The fluid flows through a first actuator to extend the actuator rod, and then simultaneously, the fluid flows through the second actuator to retract the rod. The double-ended-rod actuator has an advantage over single ended hydraulic actuators allowing for the equal distribution of hydraulic fluid since the rod is on both sides of the piston creating an equal volume of fluid on each side of the piston. The pivoting can be automatic with a controller, or manually with a manual valve/switch and lever. A controller can be a much more efficient method of controlling the implement-actuators when the controller is combined with a guidance system. The hydraulic actuators can be synchronized by bringing the actuators to a positive dead stop at the end of a cycle at either full extension or full retraction. Leakage in cylinder seals or valves causes minor position differences after each stroke if the actuators are not synchronized. In the alternative, hydraulic actuators with linear position sensors can be used to accurately control the position of the actuator rod. Power sources for the implement actuators can be pressurized hydraulic fluid, electricity or mechanical power from another actuator such as a hydraulic actuator.

One accurate way to synchronize hydraulic cylinders is with servovalves. Servovalves independently control each cylinder with electronic position feedback, and compare each actuators position with all others. Using servovalves to synchronize the linear actuators works well with actuators that never go to a home position such as a fully extended or fully retracted actuator.

The connection of the implement-actuator connection point to the implement should be a pivotal connection to compensate for the offsetting pivoting movement of the implement-connection devices when the implement-actuators simultaneously, inversely and proportionally extend and retract. In some instances a rotatable ball and socket may work, in other situations a hook and latch attachment with a pivotal hinge that pivots on a vertical axis may be more applicable for easier and fuller pivoting action. When using the hook and latching attachment to the implement, the hook should fit tight into the implement connection while still allowing the hook to pivot on the horizontal axis of a pin of the implement while allowing the hinge to provide the left to right positioning and alignment of the hook into the implement attachment point that is usually a horizontal pin. If a hook and latch is used for the implement connection and a hinge is not used, the hook would likely need to have a loose fit on the implement pin to allow for lateral pivot motion to occur. In any situation, a pivotal means is required to be used for flexibility of the connected parts.

One means of attaching the implement-actuators to the implement may be using the pivotal socket and ball arrangement on the end of the rod while configuring the hardware on the implement that is supporting the pin that attaches to the implement-actuator socket and ball with enough room allowing for the implement-actuator rod to pivot to the left or the right at about thirty five degrees of an angle in each lateral direction.

A system for operating the implement-actuators with a tractor and a three-point hitch allowing the implement-actuators to automatically pivot the implement while the tractor operator steers the tractor can be easily attained, the system comprising:
 a) a mobile machinery such as an agricultural or excavation tractor;
 b) the disclosed three-point hitch attached to the rear of the tractor;
 c) the disclosed three-point hitch attached to the front of the tractor;
 d) the disclosed three-point hitch with an implement-actuator mounted on each bottom-lift-arm.
 e) an implement attached to each three-point hitch;
 f) the tractor comprises steering position sensors on each front wheel, the steering position sensors communicating with a controller.
 g) the controller controls the implement-actuators according to the steering position sensors In addition, the system can also control the position of the implement to follow a predetermined path if the system further comprises:
 a) an automated steering device to steer the tractor;
 b) a side-shifting-sliding implement attachment device attached to each three-point hitch and the implement;
 c) the side-shifting-sliding implement attachment device comprises relationship sensors measuring the position of the slidable second framework with the position of the first framework.
 d) two signal receivers attached to each implement, the signal receivers aligned in a separated linear alignment and aligned with the implement centerline.
  the controller communicating with a position monitors system to control the position of the slidable second framework of the a side-shifting-sliding implement attachment device, the controller controlling the positions of the implement-actuators rods, and the position of the tractor.

A protective device may be used to prevent the implement-actuators from being overloaded with a very heavy implement that may stress and damage the implement-actuators. Some varieties of three-point attachable implements may be very heavy and may not be required to be lifted off of the ground while the implement is in use. This type of heavy three-point attachable implement generally will have height gauge wheels or skids that the implement rests on while in use and being pushed or pulled through or on the dirt surface. While the implement is in use and riding on wheels supporting most of the weight of the implement, the implement-actuators would generally be able to be used to pivot the implement and not lift the implement, in this case, the three-point hitch bottom-lift-arm would not be required to be used or even provided with lifting ability since the implement-actuators are hooked up to the implement and the implement will stabilize the height of the bottom-lift-arms.

The protective device can be a hydraulic accessory valve and activation switch configured to intercept the hydraulic fluid supplying the top-lift-arm-actuator and return the pressurized hydraulic fluid back to a fluid reserve tank when the accessory valve is activated, the hydraulic fluid will flow freely through the accessory valve to the top-lift-arm-actuator when the accessory valve is not activated. Each implement-actuator can have an extension sensor sensing an extension of the implement-actuator rod. The extension sensor communicating with the hydraulic accessory valve to activate the hydraulic accessory valve when the extension sensor senses an extension of the implement-actuator rod, therefore intercepting the supply of pressurized hydraulic fluid to the top-lift-arm-actuator, therefore preventing the bottom-lift-arms and the implement-actuators from applying upwards force to lift an attached implement. A manual switch to enable or disable the overload activation of the hydraulic accessory valve can be provided.

In addition, for an automated and addition application of the hydraulic accessory valve, the three-point hitch can comprise a stress sensor on each implement-actuator to automatically activate the hydraulic accessory valve when the stress sensor senses the implement-actuator rod is approaching or reaches its stress limit. The stress sensor will prevent an unintended stressful situation on the implement-actuators in a case such as when the implement that normally is within the allowed weight rating of the implement actuators accidentally has downward force applied to the implement. The stress sensor can be a light beam directed just below a reflector, if the light hits the reflector and reflects back to the sensor receiver, the rod of the implement-actuator is over-stressed.

BRIEF DESCRIPTION OF THE DRAWINGS

A better understanding of the present invention will be had upon reference to the following description in conjunction with the accompanying drawings in which like numerals refer to like parts throughout the views herein:

FIG. 8 is a top view of the tractor with a three-point hitch with an attached implement. Additionally showing the disclosed invention, one implement-actuator installed under each bottom-lift-arm.

FIG. 9 is a top view of the tractor with a three-point hitch, and a prior art side-shifting-sliding implement attachment apparatus with an attached implement. Additionally showing the disclosed invention, one implement-actuator installed under each bottom-lift-arm.

REFERENCE NUMERALS

Figure 29:
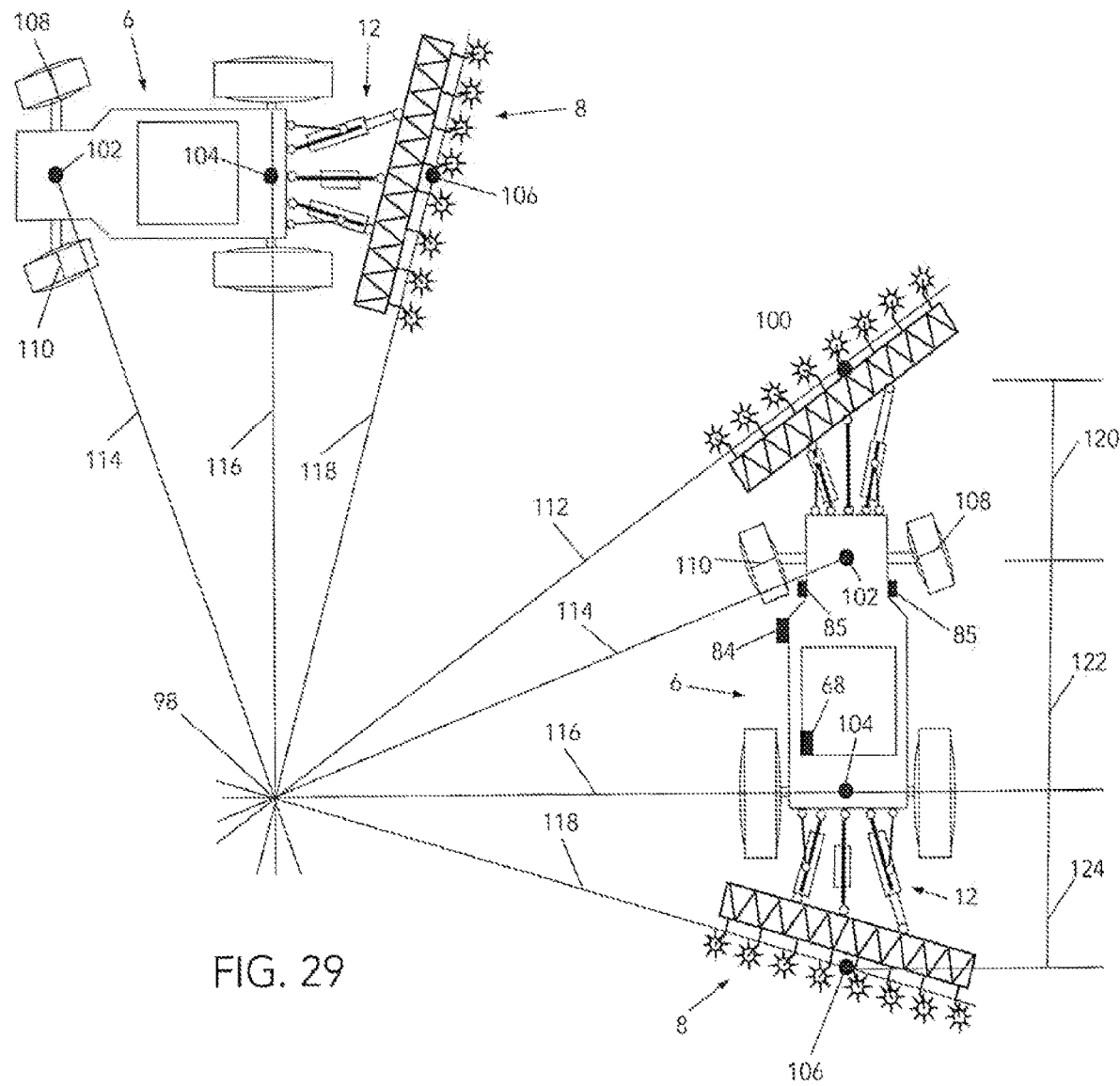
FIG. 29 is a top view of the tractor, the disclosed three-point hitch with an attached implement on the front end of the tractor and the disclosed three-point hitch with an attached implement on the rear end of the tractor.

For the convenience of the reader, the following is a list of reference numbers used in the description:
1 Implement-actuator (internally powered)
2 Implement-actuator (externally powered).
3 Power-actuator (single rod ended)
4 Power-actuator (double rod ended)
5 Tractor centerline
6 Mobile machinery—Tractor
7 Crop centerline
8 Implement
9 Implement centerline
10 Three-point hitch, Prior art
12 Three-point hitch, W/Implement-actuators
13 Stabilizer-arm
14 Top-link-arm
15 Top-link-arm with actuator
16 Bottom-lift-arm
17 Draw bar
18 Top-lift-arm
19 Draw bar hole
20 Lift-link-arm
21 Lift-link-arm with actuator
22 First sleeve
23 Second sleeve
24 First cylinder-end
25 Second cylinder-end
26 Cylinder-round
27 Cylinder-rectangular
28 Rod-round
29 Rod-rectangular
30 Rod-implement-connection-device
31 Rod-Hook and latch
32 Rod-Pivotal ball
33 Rod-tie-bar
34 Rod-hinge
35 Rod-extension
36 Bearing cap
37 First mounting hardware
38 Second mounting hardware
39 Third mounting hardware
40 Slide-hearing
41 Power-actuator-tie-bar
42 Slide-bearing-plate
43 Power-actuator-eyelet
44 Roller-bearings-and-rack
45 Top-link-arm connection to tractor
46 Top-link-arm connection to implement
47 Bottom-lift-arm connection to the tractor
48 Bottom-lift-arm implement-connection-device
50 Top-lift-arm-actuator
51 Top-lift-arm pivot point on the tractor
52 Top-lift-arm connection to lift-link-arm
53 Lift-link-arm connection to bottom-lift-arm
54 Stabilizer-arm connection to the tractor
55 Stabilizer-arm connection to the bottom-lift-arm
56 Side-shifting-sliding implement attachment apparatus
57 Side-shifting-sliding implement attachment apparatus actuator (driver)
58 First framework
59 Lower cross beam
60 Second framework (slidable)
61 Relationship sensors
62 Coupling
63 Hydraulic accessory valve
64 Plate
65 Extension sensor
66 Pin
67 Stress sensor
68 Controller
69 Stress sensor reflector
70 Display monitor and data entry platform
72 Guidance signal, GPS or Laser
74 Base station error correction signal.
76 First signal receiver
78 Second signal receiver
80 Third signal receiver
82 Fourth signal receiver 84 Steering control device
85 Steering position sensor
86 Power-actuator rod
87 Power-actuator piston
88 Power-actuator cylinder
89 Power-actuator fluid port
90 Implement-actuator piston
92 Implement-actuator fluid port
94 Implement-actuator, mounting hardware connector
96 Sleeve housing
98 Tractor pivot-point
100 Front implement center-point
102 Front axle center-point
104 Rear axle center-point
106 Rear implement center-point
108 Front implement angle (35 degrees) (in FIG. 29)
110 Right front wheel angle (19 degrees) (in FIG. 29)
112 Left front wheel angle (21 degrees) (in FIG. 29)
114 Front axle center-point turning angle (20 degrees) (in FIG. 29)
116 Rear axle aligned line (0 degrees, remains constant)
118 Rear implement angle (15 degrees) (in FIG. 29)
120 Front axle to front implement center (6 ft in FIG. 29) (in FIG. 29)
122 Tractor wheelbase (8 ft in FIG. 29) (in FIG. 29)
124 Rear axle to rear implement center (6 ft in FIG. 29) (in FIG. 29)

DETAILED DESCRIPTION OF THE INVENTION

Figure 1:
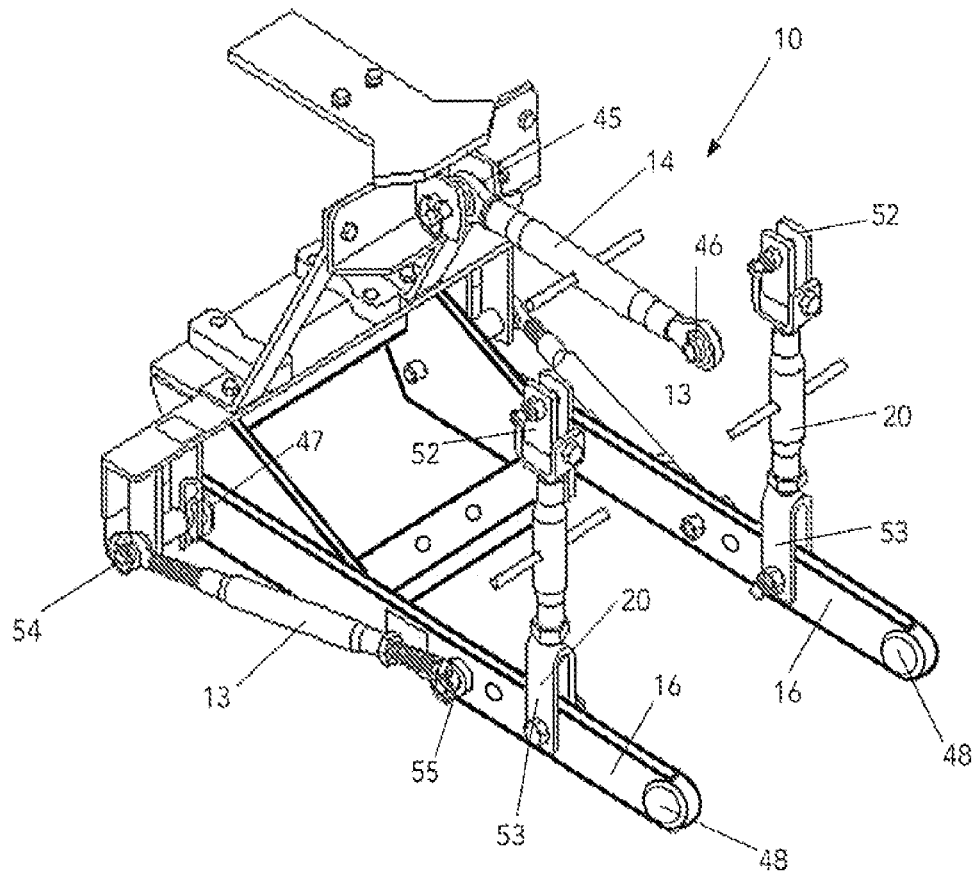
FIG. 1 is a perspective view showing a prior art three-point hitch

FIG. 1 is a perspective view showing a prior art three-point hitch 10. The three-point hitch 10 attaches to the tractor 6 (not shown) with attachment brackets. The top-link-arm 14 connects to the tractor at top-link-arm connection to tractor 45 and the top-link-arm connects to the implement at the top-link-arm connection to implement 46. The bottom-lift-arms 16 extend from the tractor 10 (not shown) and connect at bottom-lift-arm connection to the tractor 47 on the tractor brackets, the bottom-lift-arms 16 connect to the implement 8 (not shown) at bottom-lift-arm connection to the implement 48. The lift-link-arms 20 attach to the bottom-lift-arms 16 at the lift-link-arm connection to bottom-lift-arms 53 and the lift-link-arms 20 attach to the top-lift-arms (not shown) at the lift-link-arm connection to top-lift-arm 52. The stabilizer arms attach to the tractor 6 (not shown) at the stabilizer connection to tractor 54 and connect to the bottom-lift-arm 16 at the stabilizer connection to the bottom-lift-arm 55. The lift-link-arms attach to the top-lift-arms 18 (not shown) and the top-lift-arms are actuated by a top-lift-arm-actuator 50 (not shown)

Figure 2A:
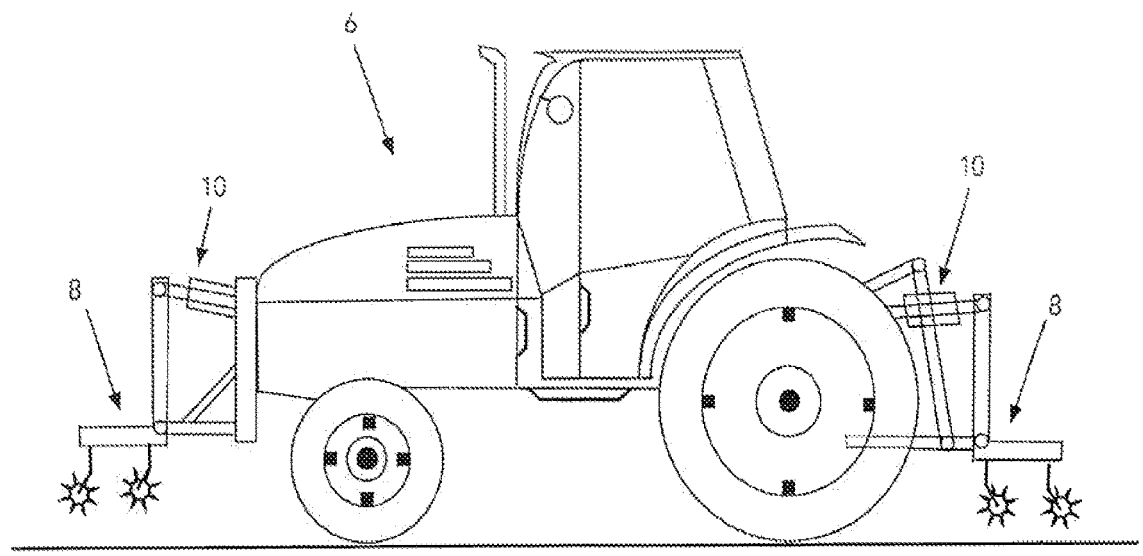
FIG. 2a is a side view of a tractor with a prior art three-point hitch mounted on the front and rear the tractor with an implement mounted on each three-point hitch.

FIG. 2a is a side view of a tractor 6, a prior art three-point hitch 10 mounted on the front of the tractor 6 and the implement 8 connected to the three-point hitch 10. A prior art three-point hitch 10 mounted on the rear of the tractor 6, the implement 8 connected to the rear three-point hitch 10 is also shown.

Figure 2B:
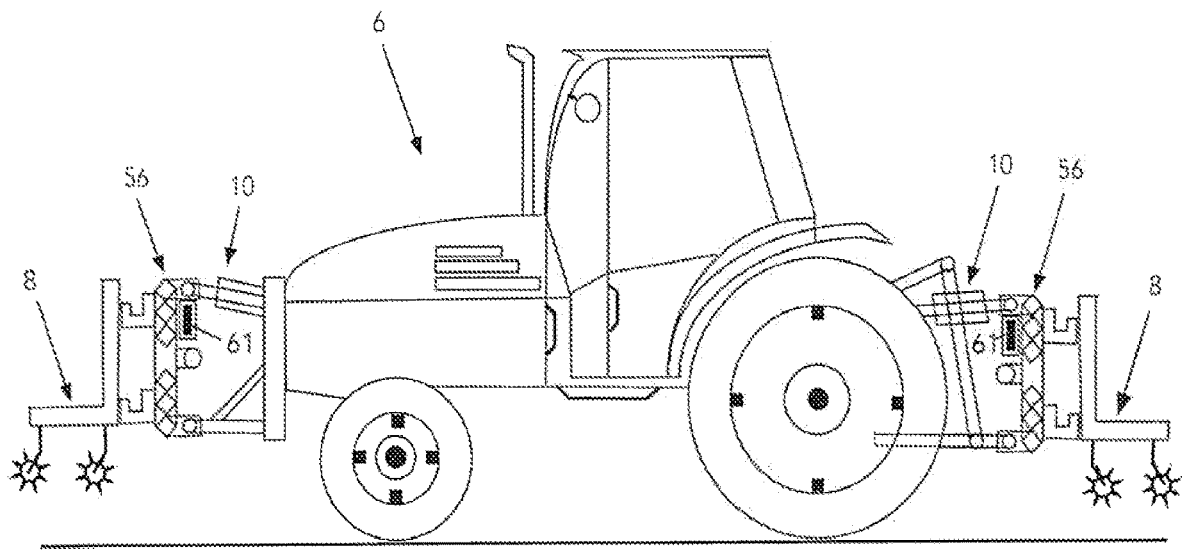
FIG. 2b is a side view of a tractor with a prior art three-point hitch mounted on the front and the rear the tractor with a side-shift-sliding implement connection apparatus implement mounted on each three-point hitch and an implement mounted on each a side-shift-sliding implement connection apparatus.

FIG. 2b is a side view of the tractor 6, a prior art three-point hitch 10 mounted on the front of the tractor 6, a side-shift-sliding implement connection apparatus 56 connected to the front three-point hitch and the implement 8 connected to the front side-shift-sliding implement connection apparatus 56. A prior art three-point hitch 10 mounted on the rear of the tractor 6, a side-shift-sliding implement connection apparatus 56 connected to the rear three-point hitch and the implement 8 connected to the rear side-shift-sliding implement connection apparatus 56 is also shown.

Figure 2C:
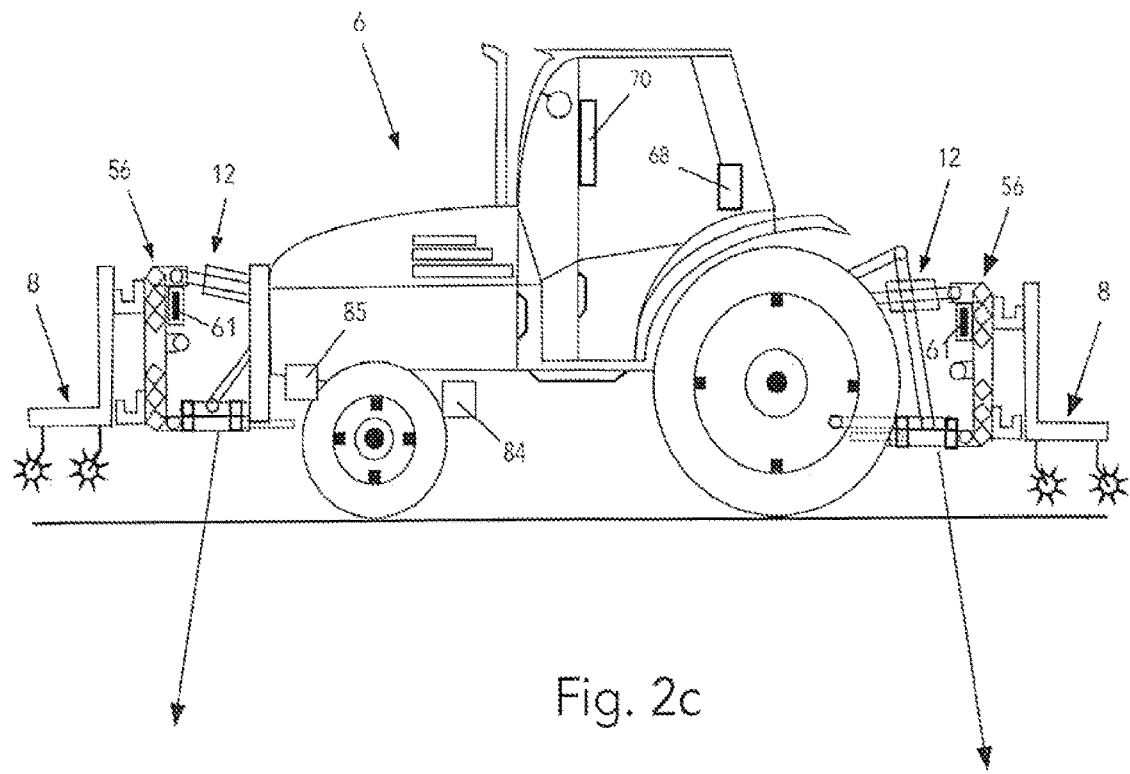
FIG. 2c is a side view of the tractor showing the front and rear three-point hitch of the disclosed invention. Also showing a steering control device and a steering position sensor.
Figure 2C:
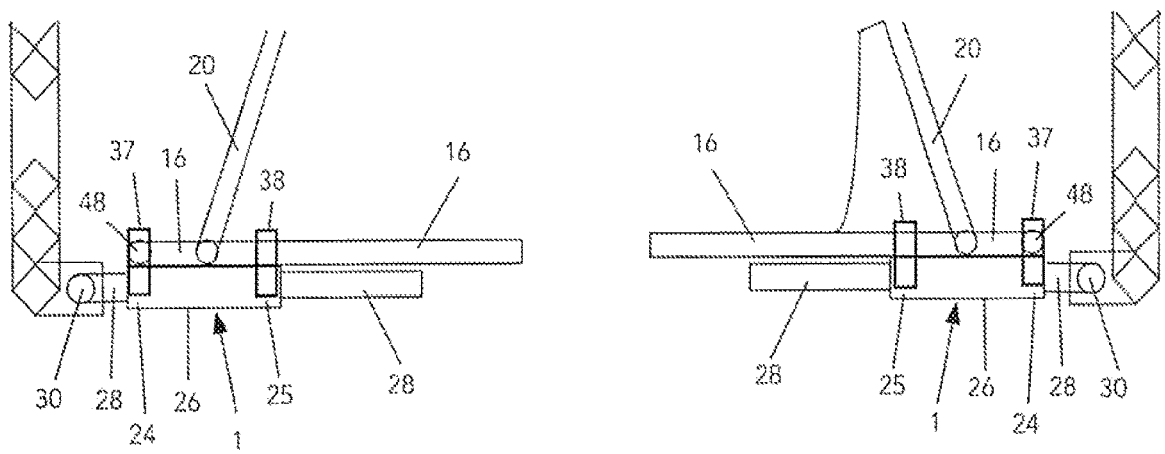

FIG. 2c is a side view of the tractor 6 showing a front three-point hitch of the disclosed invention 12 and a rear three-point hitch of the disclosed invention 12. A steering control device 84 and a steering position sensor 85 shown mounted on the tractor 6. A controller 68 can communicate with the steering control device 84 and with the steering position sensors 85. The steering control device 84 steering the tractor 6 and the steering position sensors 85 communicating with the controller 68 to pivot the three-point connected implement in line with the tractor 6 steering angle and pivot point of the tractor. The implement-actuators 1 are shown connected under the bottom-lift-arms 16 of the three-point hitch 12. The implement-actuators 1 are of the double rod-ended configuration showing the rod 28 on both ends of the implement-actuator 1. The three-point-hitch bottom-lift-arm 16 is shown with the lift-link-arm 20 connected to it.

Figure 3A:
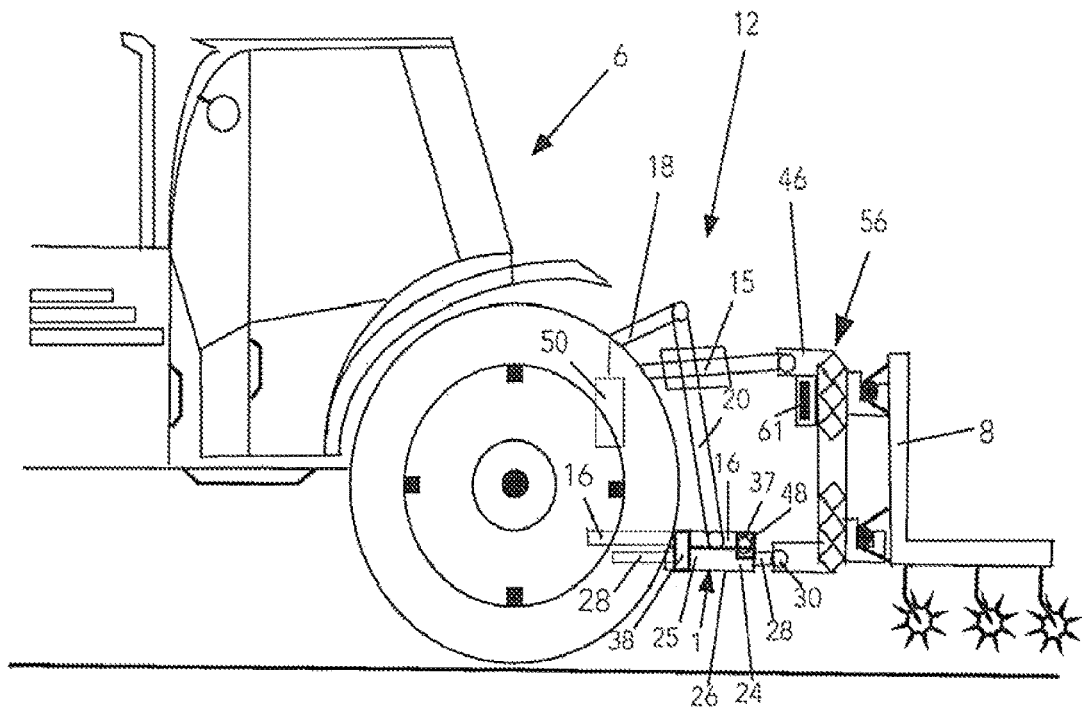
FIG. 3a is a side view of the tractor with a three-point hitch, a prior art side-shifting implement attachment apparatus and an attached implement. Additionally showing the disclosed invention, one implement-actuator installed under each bottom-lift-arm.
Figure 3B:
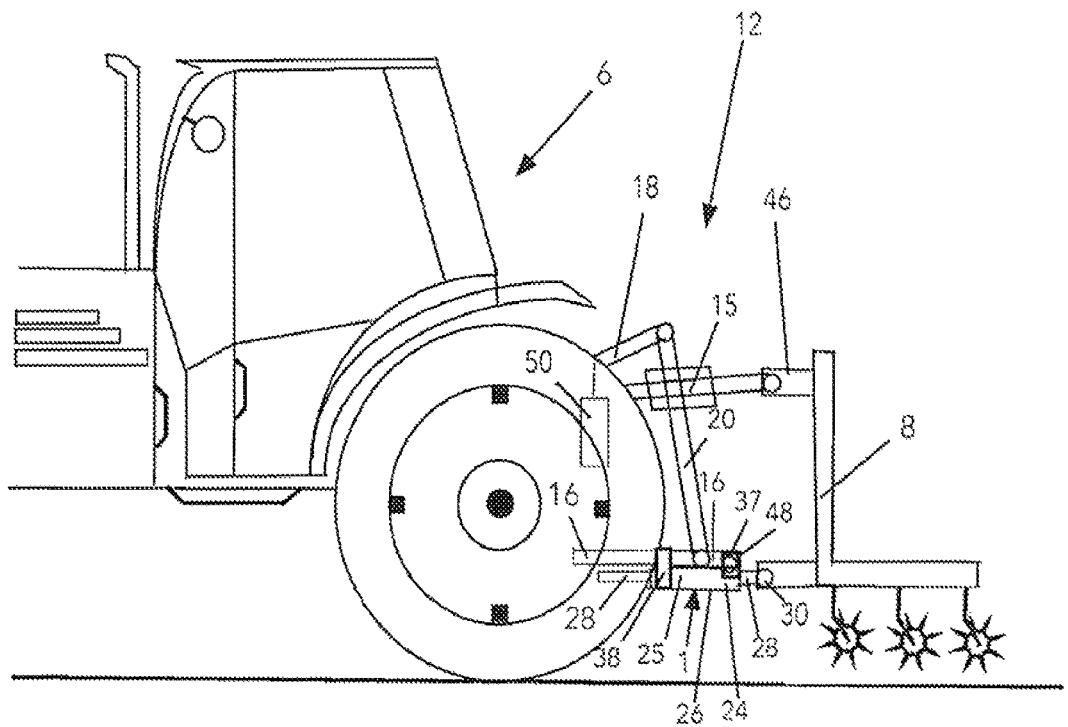
FIG. 3b is a side view of the tractor with a three-point hitch and an attached implement. Additionally showing the disclosed invention, one implement-actuator installed under each bottom-lift-arm.

FIG. 3a is a side view of a tractor 6 with a side-shifting-sliding implement attachment apparatus 56 attached to the disclosed invention three-point hitch 12 with an attached implement 8. Typically, two implement-actuators 1 will be installed, one under each bottom-lift-arm 16. The top-lift-arm 18 is connected to the lift-link-arm 20 that connects to the bottom-lift-arm 16, The top-lift-arm-actuator 50 raising on command, therefore raising the top-link-arm 20 and in effect, raising the bottom-lift-arm 16. The implement-actuator 1 is shown attaching under the bottom-lift-arm 16, this position keeps the implement-actuator 1 away from the lift-link-arms 20 that connects on top of the bottom-lift-arms 16, the lift-link-arms 20 also connect to the top-lift-arms 18. The conventional bottom-lift-arm 16 also provides protection to the implement-actuator 1 when the implement-actuator 1 is mounted in the position under the bottom-lift-arms 16. It is possible to mount the implement-actuator 1 on top of the bottom-lift-arm 16 if room is made on the bottom-lift-arm 16 to avoid contact with the lift-link-arm 20. Shown is the implement 8 connected to the side-shifting-sliding implement attachment apparatus 56 that is connected to the disclosed three-point hitch 12. The bottom two attachment points 47+47 (see FIG. 30) of the side-shifting-sliding implement attachment apparatus 56 being attached to the two rod-implement-connection-devices 30 that is attached to the end of the implement-actuator rod 28. The implement-actuator rod 28 extends from and retracts into the implement-actuator cylinder 26 while leaving enough rod 28 length in the cylinder 26 to properly support the rod 28 when the rod 28 is extended from the implement-actuator cylinder 26. The top-link-arm connection to tractor 45 (see FIG. 30) of the side-shifting-sliding implement attachment apparatus 56 being attached to the top-link-arm connection 46 to the implement 8. The implement-actuator 1 first mounting hardware 37 attaches the implement-actuator 1 cylinder 26 and to the bottom-lift-arm connection to the implement 48 using hardware plates that are rigidly attached to the implement-actuator 1 first cylinder 26 with a method such as bolting or metal welding. The implement-actuator 1 first mounting hardware 37 attaches the implement-actuator 1 cylinder 26 at the implement-actuator 1 first cylinder-end 24. A pin or a bolt can be used to securely and removably attach the implement-actuator 1 first mounting hardware 37 to the bottom-lift-arm connection to the implement 48. The implement-actuator 1 second mounting hardware 38 attaches the implement-actuator 1 cylinder 26 at the implement-actuator 1 second cylinder-end 25 and attaches to the bottom-lift-arm 16 at a location on the bottom-lift-arm 16 towards the tractor 6. The top-link-arm with actuator 15 is shown. The top-lift-arm-actuator 50 is shown with hidden lines as the actuator or the actuators are hidden by the tractor 6 tires. FIG. 3*b* is a mirror image of FIG. 3*a* without the implement-attachment-apparatus 56 installed.

Figure 4:
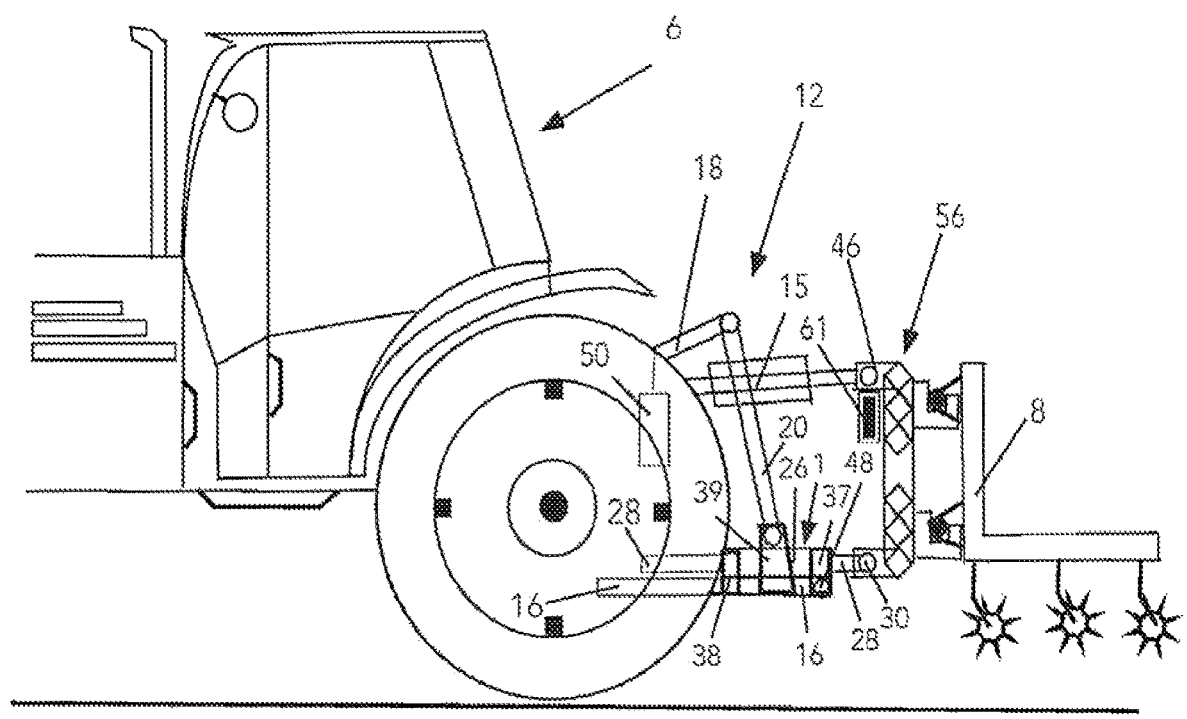
FIG. 4 is a side view of the tractor with a three-point hitch, and a prior art side-shifting implement attachment apparatus with an attached implement. Additionally showing the disclosed invention, one implement-actuator installed on top of each bottom-lift-arm.

FIG. 4 is the same drawing as FIG. 3*a* with the exception that the implement-actuators 1 are shown mounted on top of the bottom-lift-arms 16 instead of under the bottom-lift-arms 16. In order to allow this mounting configuration of the implement-actuators 1 mounting position, third mounting hardware 39 is used to allow the top-lift-arm 20 to bolt to the third mounting hardware 39 above the implement-actuators 1 while the third mounting hardware 39 offsets around the implement-actuators 1 and then bolts to the bottom-lift-arms 16.

Figure 5:
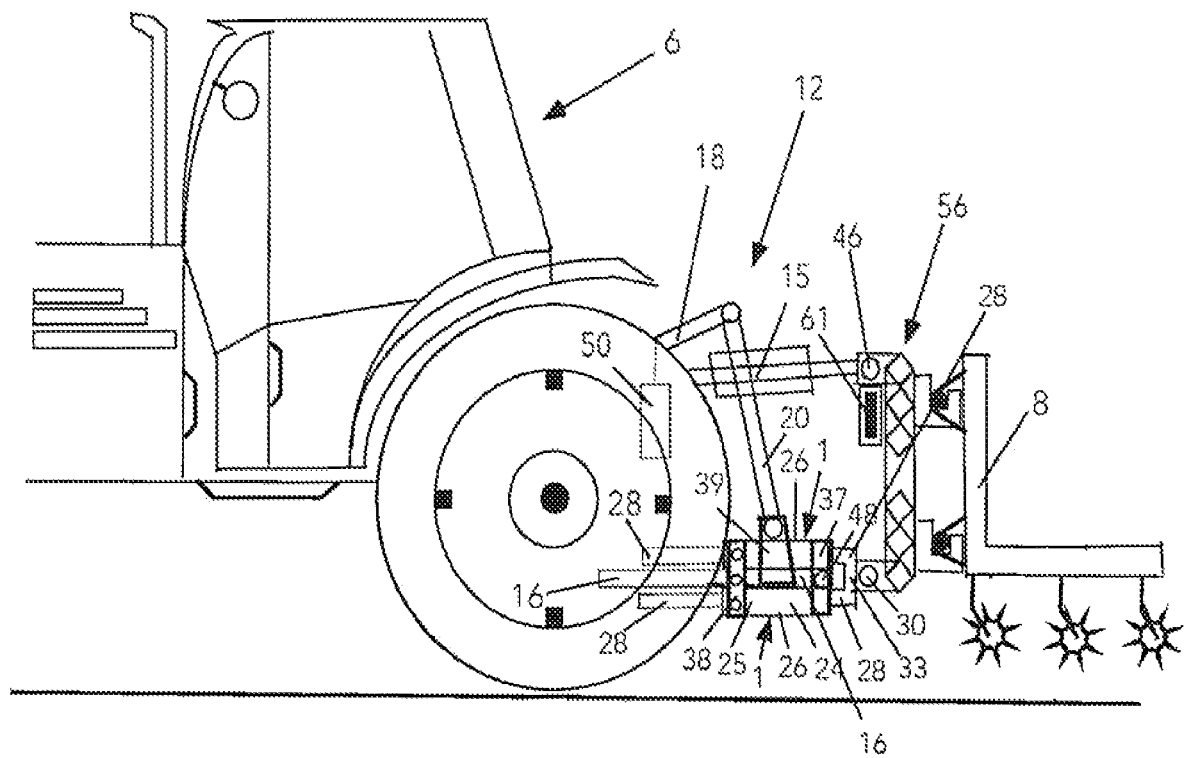
FIG. 5 is a side view of the tractor with a three-point hitch, and a prior art side-shifting implement attachment apparatus with an attached implement. Additionally showing the disclosed invention, one implement-actuator installed on top of each bottom-lift-arm and one implement-actuator installed under each bottom-lift-arm.

FIG. 5 is the same drawing as FIG. 3*a* and FIG. 4 with the exception that the implement-actuators 1 are shown mounted on top of the bottom-lift-arms 16 and under the bottom-lift-arms 16, therefore utilizing a total of four implement-actuators 1 on the disclosed three-point hitch 12, two implement-actuators 1 on each bottom-lift-arm 16. This design creates a strong support base for heavy implements. The two implement-actuator rods 28 are joined together using rod-tie-bar 33. The first mounting hardware 37 and the second mounting hardware 38 are altered to join both the top and the bottom implement-actuators 1 with the bottom-lift-arm 16. The third mounting hardware 39 can remain the same as FIGS. 3*a* and 4 or the third mounting hardware 39 can also be changed to support both the top and the bottom implement-actuators 1.

Figure 6A:
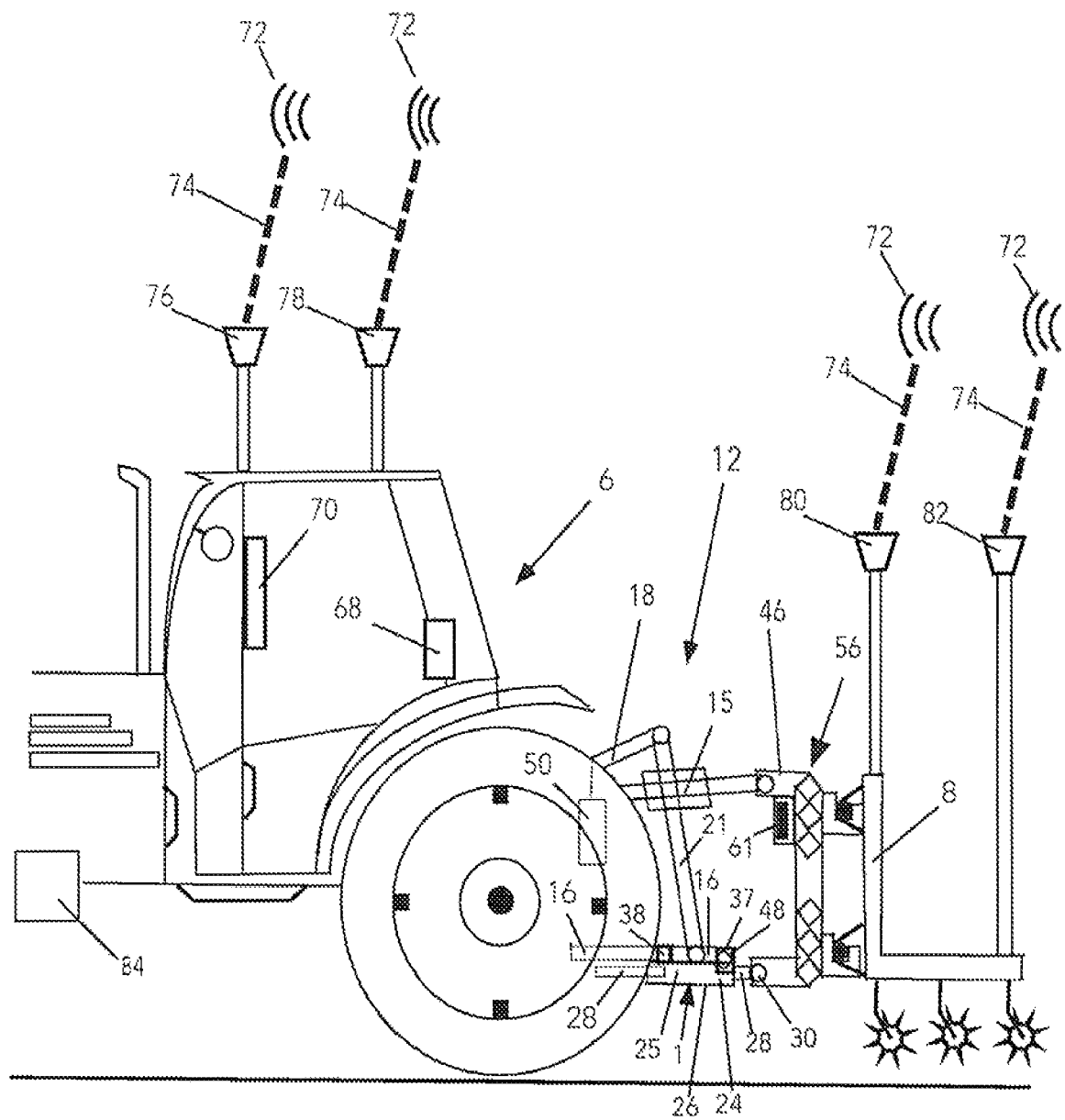
FIG. 6a is a side view of the tractor with a three-point hitch on the rear of the tractor, and a prior art side-shifting implement attachment apparatus on the three-point hitch with an attached implement. Additionally showing the disclosed invention, one implement-actuator installed under each bottom-lift-arm. Also shown are the components of the tractor implement guidance system in a GPS signal configuration.

FIG. 6*a* is the same drawing as FIG. 3*a* with the exception of added components of a position monitoring system. The components shown are a controller 68, a display monitor and data entry platform, and signal receivers 76, 78, 80, 82. In addition, the guidance signals 72+74 from a GPS or laser guidance system are shown as 72 and 74. If the system is a GPS system, the signal 74 would be from the GPS satellites and signal 72 would be from a base station that would redirect the signal to a more accurate destination to the signal receivers 76, 78, 80, 82. There are two signal receivers 76+78 mounted on the tractor 6 and two signal receivers 80+82 mounted on the implement 8. Signal receivers 76+78 are mounted inline with the crop centerline 7 and Signal receivers 80+82 are mounted inline with the implement centerline 9. Two signal receivers on the tractor 6 and the two signal receivers on the implement 8 will enable a position monitoring system align the crop centerline 7 and the implement centerline 9 with the tractor centerline 5 while the tractor 6 is in motion in a farm field. Two signal receivers positioned on the tractor 76+78 and two signal receivers positioned on the implement 80+82, the receivers being aligned in a separated linear alignment with the tractor centerline and the implement centerline are an advantage when compared to just one signal receiver on the tractor and one signal receiver on the implement. Using only one signal receiver on the implement 8, the single signal receiver may be on point with the crop centerline 7, but the implement centerline 9 may not be aligned with the crop centerline 7 when the tractor 6 and the implement 8 are pivoted during steering corrections of the tractor 6. The guidance signal 72 is shown being received by the first signal receiver 76, the second signal receiver 78, the third signal receiver 80, and the fourth signal receiver 82. The tractor 6 steering control device 84 is also shown in position near the tractor steering gearbox to operate the tractor steering. The guidance system using the signal receivers 76+78+80+82 mounting orientation to keep the tractor 6 and the implement 8 in the predetermined path and the crop centerline 7 (see FIG. 10*a*) aligned with the predetermined path while also keeping the implement centerline 9 (see FIG. 10*a*) aligned with the predetermined path. The signal receivers 76 and 78 are mounted a distance apart along the crop centerline 7 (see FIG. 10*a*) and the signal receivers 80 and 82 mounted a distance apart along the implement centerline 8 (see FIG. 10*a*). FIG. 6 also shows the implement 8 with two signal receivers 80+82 aligned with the implement centerline 9 in a linear relationship allowing the implement centerline 9 to be detected and controlled by the implement-actuators 1. The receivers can be GPS receivers, laser receivers or any other receiver or detection device. In the alternative to using two signal receivers on the tractor and two signal receivers on the implement, there can be two signal receivers on the implement only to keep the implement centerline in line with the crop centerline 7, and then use the relationship sensors 61 mounted on the side-shifting-sliding implement attachment apparatus 56 to allow the controller to position the tractor on a desired predetermined path. The tractor centerline 5 can then be determined and aligned where preferable by using the relationship sensors 61 combined with measuring the extension of each implement-actuator rod 28 from the corresponding cylinder 26 to measure and identify the tractor centerline position.

Figure 6B:
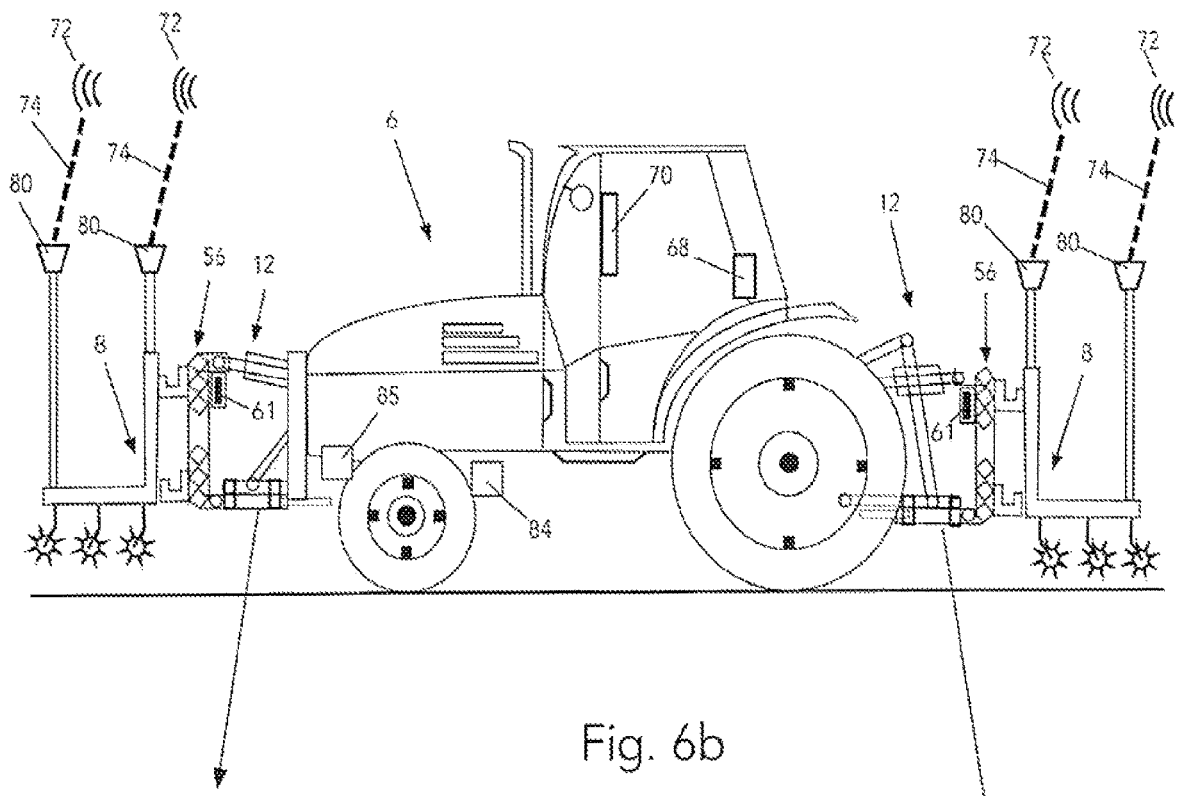
FIG. 6b is a side view of the tractor with a three-point hitch on the front and the rear, and a prior art side-shifting implement attachment apparatus on each three-point hitch with an attached implement. Additionally showing the disclosed invention, one implement-actuator installed under each bottom-lift-arm. Also shown are the components of the tractor implement guidance system in a GPS signal configuration.
Figure 6B:
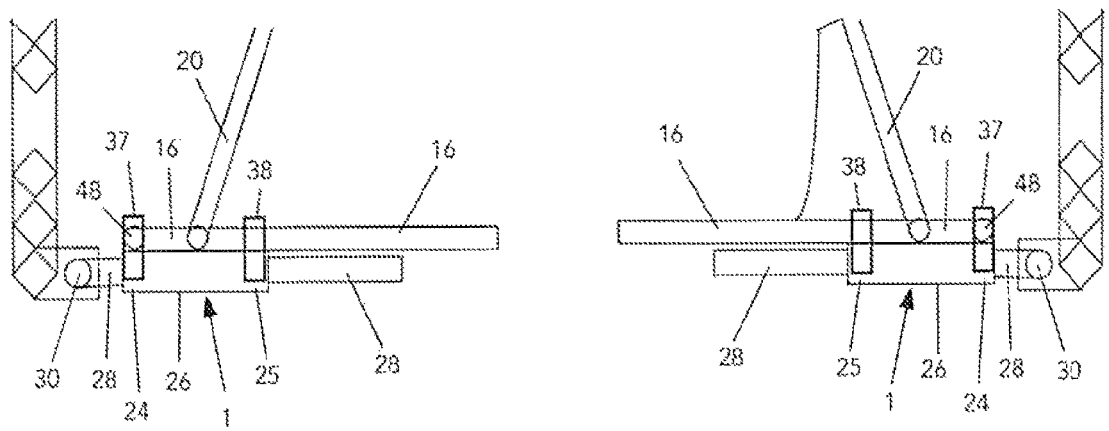

FIG. 6*b* is a similar drawing of FIG. 6*a* with the addition of a three-point hitch 12 on the front of the tractor 6, and a prior art side-shifting implement attachment apparatus 56 on the front three-point hitch 12 with an attached implement 8. Shown are two GPS receivers on the rear implement and two GPS receivers on the front implement, no GPS receivers are mounted on the tractor. The GPS receivers are aligned in a separated linear alignment with the implement centerline. The implements centerline position can be easily identified and adjusted by the GPS receivers while the tractor centerline can be easily identified and controlled using the relationship sensors 61 on each side-shifting-sliding implement attachment apparatus 56 combined with measuring the extension of each implement-actuator rod 28 from the corresponding cylinder 26 to measure and identify the tractor centerline position.

Figure 7:
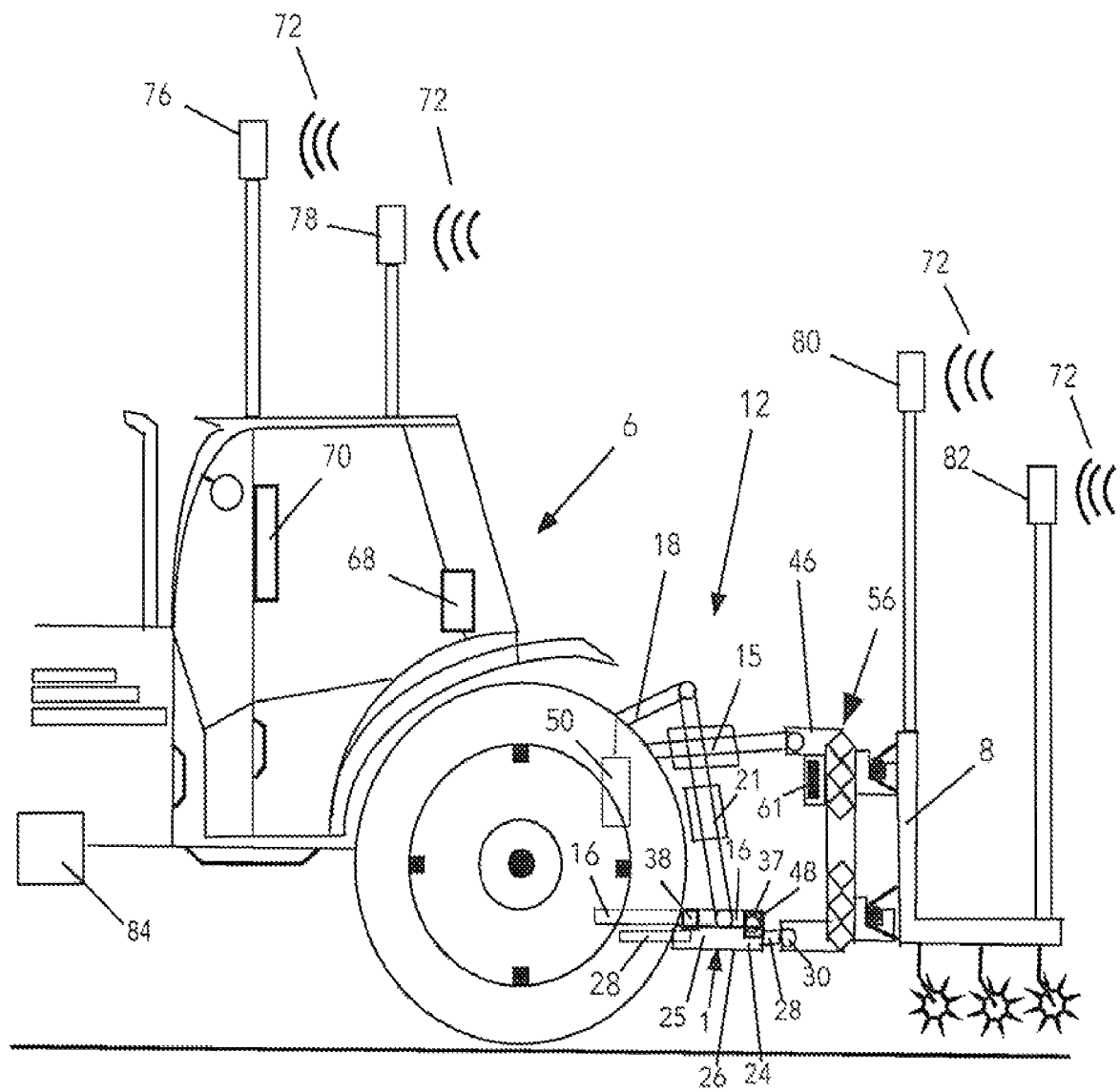
FIG. 7 is a side view of the tractor with a three-point hitch, and a prior art side-shifting implement attachment apparatus with an attached implement. Additionally showing the disclosed invention, one implement-actuator installed under each bottom-lift-arm. Also shown are the components of the tractor implement guidance system in a laser signal configuration.

FIG. 7 is the same drawing as FIG. 6*a* with the exception that the signal receivers 76, 78, 80, and 82 are laser signal receivers receiving a laser signal. The laser signal would usually be emitted from a rotating device emitting a signal in a vertical plane. The rotating laser emitter causes the laser signal to be intermittent for safety reasons preventing serious damage to the eyes of people and animals.

FIG. 8 shows the implement 8, the tractor 6 with the disclosed three-point hitch 12 attached, the bottom-lift-arms 16, the implement-actuators 1, the stabilizer arms 13, the top link arm 14. The lift-link-arms 20 (not shown) are connected to the bottom-lift-arms 16 and the top-lift-arms 18 (not shown). If the bottom-lift-arms do not pivot and the implement-actuators 1 extend and retract in equal opposite linear length, the top-link-arm 14 and the lift-link-arms 20 are not required to be adjustable. The top-lift-arms 18 (not shown) are raised by a single action actuator (see FIG. 6).

FIG. 9 shows a three-point hitch 12 setup similar to FIG. 8 with the exception of the added side-shift-sliding implement connection apparatus 56. The side-shift-sliding implement connection apparatus 56 creates side-shifting motion for lateral implement placement.

Figure 10A:
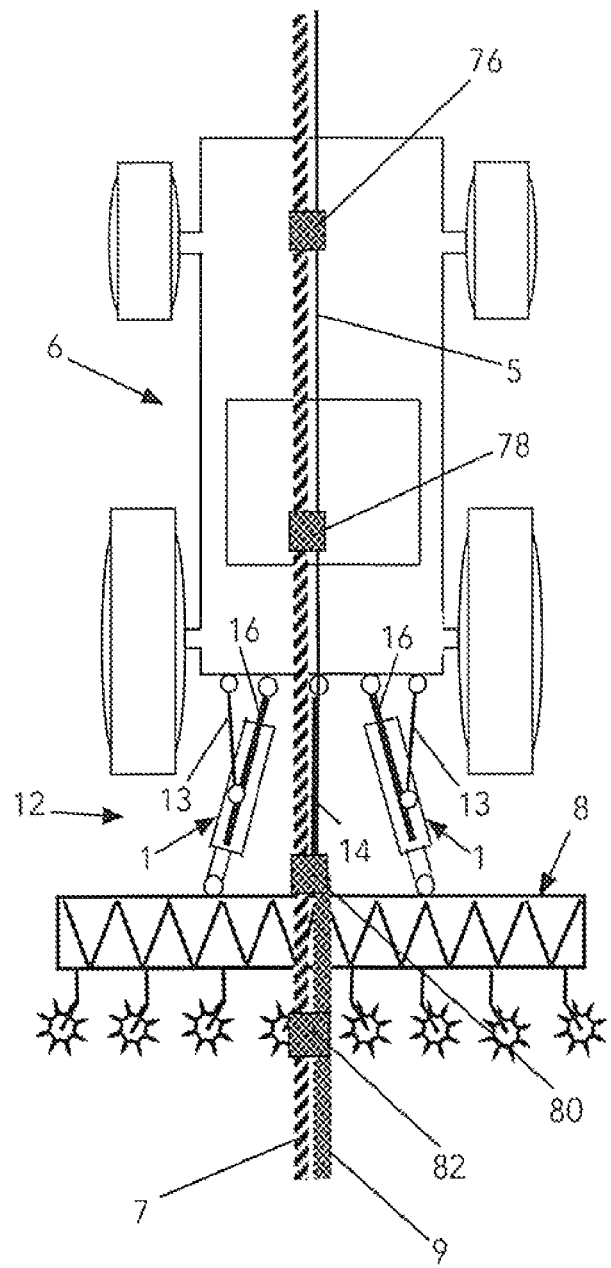
FIG. 10a is a top view of the tractor and shows the centerline of the tractor aligned with the direction of travel of the tractor. The centerline also aligns with the top-link-arm connection to the tractor. The implement centerline and the crop centerline are also shown aligning with the tractor centerline.

FIG. 10*a* is a top view of the tractor 6 and shows the crop centerline 7 aligned with the direction of travel of the tractor 6. The crop centerline 7 is also aligning with the top-link-arm connection of the tractor 42 three-point hitch 12. The implement centerline 9 is shown aligning with the crop centerline 7 and the tractor centerline 5. Also shown are signal receivers 76, 78, 80 and 82. The signal receives are all aligned with the crop centerline 7, the implement centerline 9 and the tractor centerline 5.

Figure 10B:
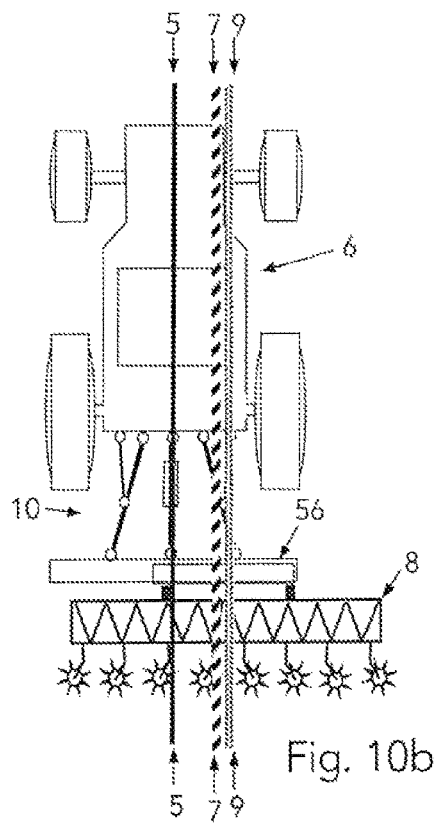
FIGS. 10b, 10c, 10d, and 10e are top views of the tractor, implement and crop centerlines of the prior art three-point hitch and of the disclosed invention three-point hitch while the tractor is performing corrected steering maneuvers.
Figure 10C:
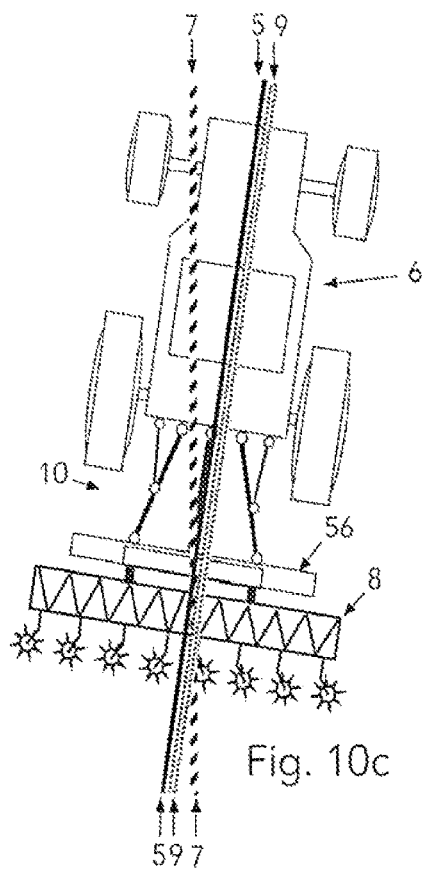

FIG. 10b is a top view of the tractor and the prior art three-point hitch 10 showing the tractor centerlines 5, the crop centerlines 7, and the implement centerline 9. The crop centerline 7 and the implement centerline 5 aligned together properly, the tractor centerline 5 is offline and at this situation, the tractor 6 will start corrective steering maneuvers. FIG. 10c is a top view of the tractor and the prior art three-point hitch 10 while the tractor is performing corrected steering maneuvers, and although the crop centerline 7 and the implement centerline 9 intersect each other at the center of the implement 8, the implement centerline 9 is off of the crop centerline 7 and will cause damage to any rows of crops in corresponding crop centerlines 7.

Figure 10D:
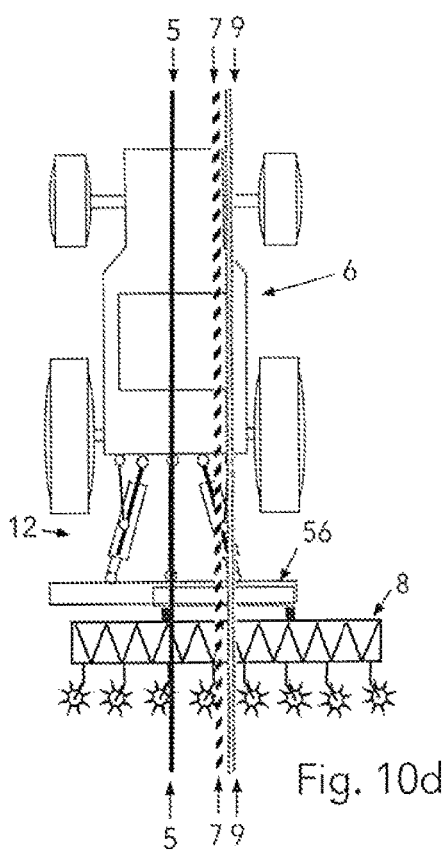
Figure 10E:
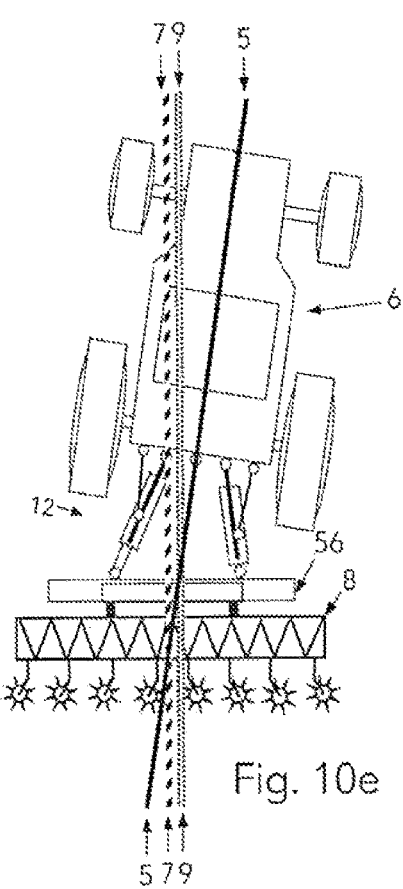

FIG. 10d is a top view of the tractor and the disclosed three-point hitch 12 showing the tractor centerlines 5, the crop centerlines 7, and the implement centerline 9. The crop centerline 7 and the implement centerline 5 aligned together properly, the tractor centerline 5 is offline and at this situation, the tractor 6 will start corrective steering maneuvers. FIG. 10e is a top view of the tractor and the disclosed three-point hitch 12 while the tractor is performing corrected steering maneuvers, of the tractor 6. In this position, the crop centerline 7 and the implement centerline 9 remain aligned properly with each other and will not cause damage to any rows of crops in corresponding crop centerlines 7.

FIGS. 11-14 is a side view of the implement-actuator 1 in a retracted position mounted under the bottom-lift-arm 16. Shown are double ended hydraulic linear actuators with internal slide-bearings 40 supporting the rod 28, the slide bearings 40 are required to be heavy duty to support the weight of the implement 8 (not shown) and be preferably removable and serviceable, the rod 28 is required to be hardened steel and generally chrome plated to reduce friction and prevent rust. Pressurized hydraulic fluid moves the piston 90, the piston 90 moves the rod 28. The first mounting hardware 37 is shown attaching at the first cylinder-end 24 mounting the implement-actuator 1 cylinder 26 to the bottom-lift-arm implement connection device 48 using a pin insert therein, therefore securely holding the implement-actuator 1 in place. The second mounting hardware 38 is shown attaching at the second cylinder-end 25 and mounting the implement-actuator 1 along the bottom-lift-arm 16 towards the tractor (not shown). The implement-actuator 1 second mounting hardware 36 can be secured to the bottom-lift-arm with a means such as bolting. Implement-actuator 1 first and second mounting hardware 24+25 can be securely attached to the implement-actuator 1 cylinder 26 with a means such as welding. The bottom-lift-arm connection to the implement 48 is no longer used for a connection to the implement 8, the implement-actuator 1 implement connection eyelet 30 is now the connection to the implement enabling the movement of the implement by the implement-actuator 1. The implement-actuator rod 28 is shown fully retracted in the implement-actuator cylinder 26. Shown is implement-actuator 1 implement connection hinge 34 comprised in the implement-actuator rod 28 with the rod 28 also comprising the implement-actuator 1 rod-implement-connection-device 30.

Figure 11:
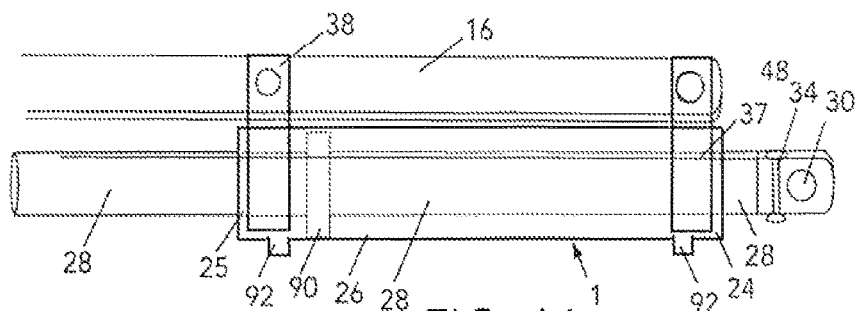
FIGS. 11-14 is a side view of the various implement-actuator mounting orientations.
Figure 12:
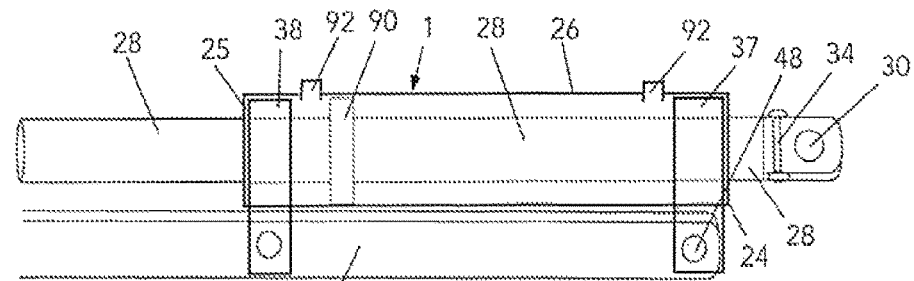

FIG. 12 is similar to FIG. 11 showing a side view of the implement-actuator 1 in a retracted position mounted over the bottom-lift-arm 16 instead of under the bottom-lift-arm 16 as FIG. 11 shows. The remaining components of FIG. 12 are the same as the FIG. 11 components.

Figure 13:
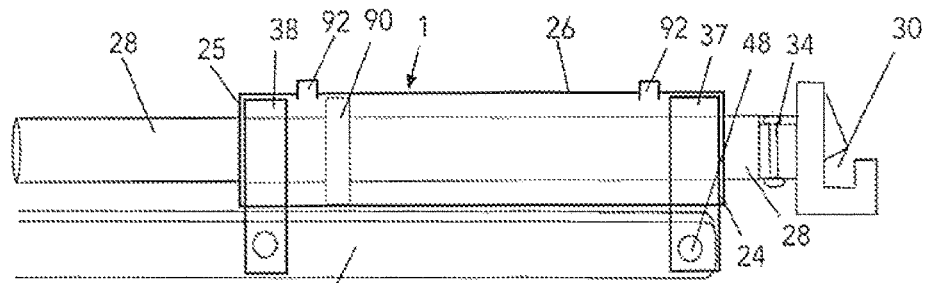
Figure 14:
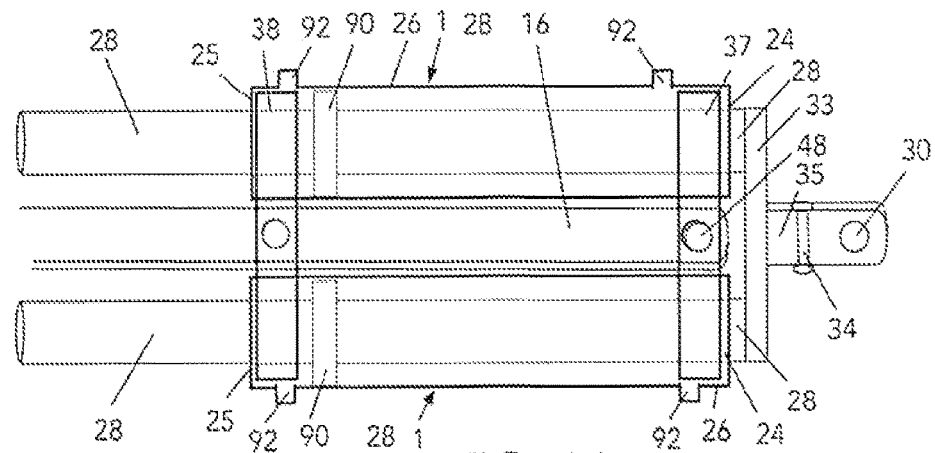

FIG. 13 is similar to FIG. 12 showing of the rod-implement-connection-device 30 as a hook and latch configuration. The implement-actuator 1 in a retracted position FIG. 14 is a side view of the implement-actuator 1 in a retracted position mounted over the bottom-lift-arm 16 and the implement-actuator 1 mounted under the bottom-lift-arm 16 showing two implement-actuators 1 mounted on one bottom-lift-arm. The implement-actuator 1 second mounting hardware 38 extends across both implement-actuator 1 cylinders 26 mounted near the second cylinder-end 25 and attached to the bottom-lift-arm 16. The implement-actuator 1 first mounting hardware 37 extends across both implement-actuator 1 cylinders 26 mounted near the first cylinder-end 24 and attached to the bottom-lift-arm 16. Two implement-actuator 1 rods 28 are connected by the implement-actuator 1 rod tie bar 33, the implement-actuator 1 rod tie bar 33 is then connected to an implement-actuator 1 rod extension 35. Also shown is the implement-actuator 1 implement connection hinge 34 and the rod-implement-connection-device 30. The two implement-actuators 1 combined with the two implement-actuator 1 rods 27 creates a strong support base for very heavy implements.

Figure 15:
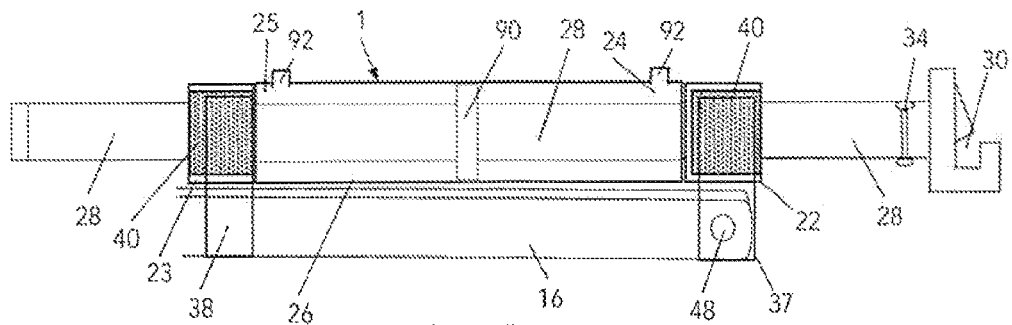
FIGS. 15-18 is another design style of the implement-actuator. This design allows cylinder and the internal components to float preventing side load force from being applied to the components of the cylinder. The implement-actuator is a double-ended actuator.

FIG. 15 is a side view showing the implement-actuator 1 mounted on top of a bottom-lift-arm 16 in another design style of the implement-actuator 1 of a double ended actuator design with the cylinder 26 floating between the first sleeve 22 and the second sleeve 23. The cylinder 26 is now supported by the rod 28, and the rod 28 is supported by the two sleeves 22+23. This design allows the cylinder 26 and the cylinder 26 internal components to float between the first sleeve 22 and the second sleeve 23, preventing side load force from being applied to the components of the cylinder 26. The first sleeve 22 and the second sleeve 23 with slide bearings 28 surround the rod 28 at both ends of the cylinder 26. The sleeves 22+23 with slide bearings 40 bear the load put on the rod 28 by the implement 8 (not shown), keeping the load from the implement 8 (not shown) from affecting the internal components (excluding the rod) of the cylinder 26. The first mounting hardware 37 and the second mounting hardware 38 attach the sleeves 22+23 to support the rod 28, the rod 28 then supports the cylinder. The remaining components not discussed are the same as the components in FIG. 13. The position of the rod 28 in the cylinder 26 is the neutral position with the same length of rod 28 protruding from the cylinder 26 at each end. Shown are double ended hydraulic linear actuators, the external slide-bearings supporting the rod are required to be heavy duty to support the weight of the implement and be preferably removable and serviceable, the rod is required to be hardened steel and generally chrome plated to reduce friction and prevent rust.

Figure 16:
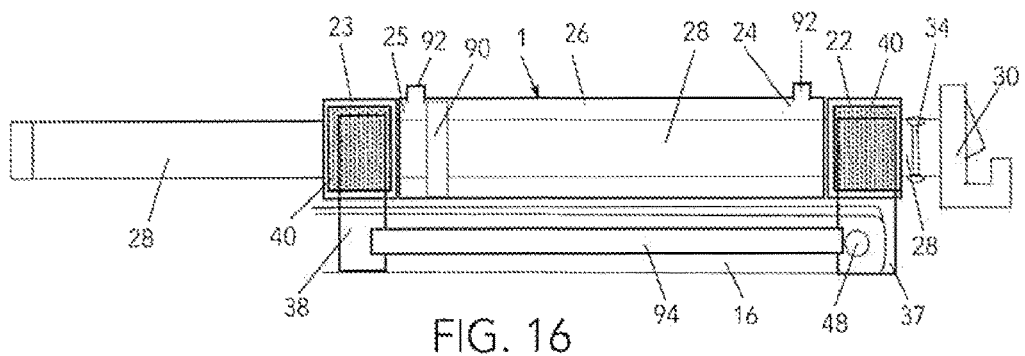

FIG. 16 is the same as FIG. 15 with the exception of the implement-actuator 1 in a retracted position and the added mounting hardware connector 94. The connector 94 helps stabilize and strengthen the first sleeve 22 and the second sleeve 23 mounting positions. The position of the rod 28 in the cylinder 26 is the retracted position.

Figure 17:
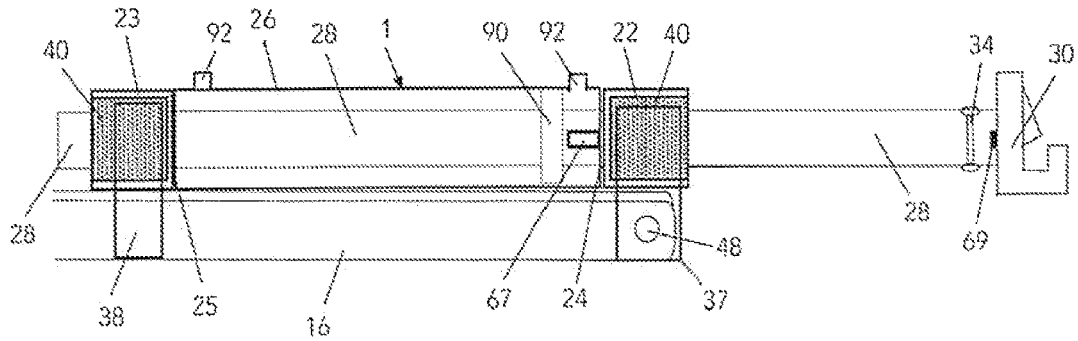

FIG. 17 is the same as FIG. 15 except the rod is in the extended position. The drawing also shows additional components of the implement-actuator 1 such as the piston 90 and the fluid ports 92 for movement of a fluid such as hydraulic fluid. Stress sensor 67 is shown mounted on the cylinder 26 and the stress sensor reflector 69 is shown mounted on the rod-implement-connection-device 30.

Figure 18:
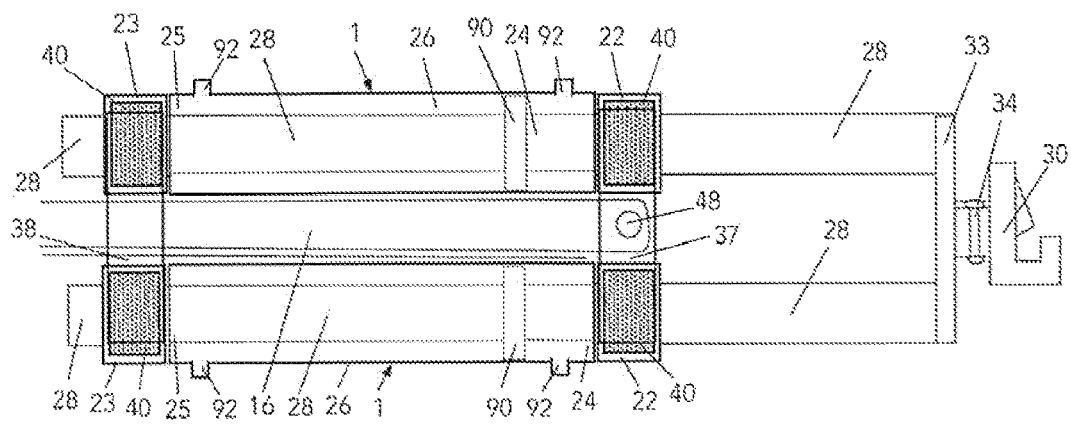

FIG. 18 shows two implement-actuators 1 mounted to each bottom-lift-arm 16 and is similar to FIG. 14 except the rod 28 is in an extended position, and the first sleeve 22 and the second sleeve 23 are located outside of the cylinder, and the slide bearings 40 located between the cylinder and the rod and are installed around the rod for support to the rod, relieving the cylinder from supporting the rod. The advantages of the implement-actuators in drawing FIG. 15 are also incorporated in this implement-actuator 1. The rod-implement-connection-device 30 is a hook and latch instead of a pivotal ball eyelet. Also shown is a rod-tie-bar 33 tying the rods 28 together and then attaching the implement-connection hinge 34 that is connected to the implement-connection hook and latch 33. The FIG. 18 design style can be used for heavy implements where two rods 28 may be required for support of the implement 8 (not shown).

FIGS. 19, 20, 21 and 22a are still another design of the implement-actuators 2 in a double rod-ended design. This design incorporates external mechanical power to move the rod 28. The cylinder 26 is fitted with a slide bearing 40 inside the cylinder 26 wherein the slide bearing 40 is right against the rod 28 allowing the slide bearing to reduce friction in the movement of the rod 28. There is no piston 90 in the cylinder 26 transferring power to the rod 28. The rod 28 is powered by an external secondary power-actuator 3+4 that is typically a hydraulic linear actuator, a properly configured electric actuator will also work for the application. The slide bearing 40 is the same length as the cylinder 26 and completely surrounds the corresponding portion of the rod 28.

Figure 19:
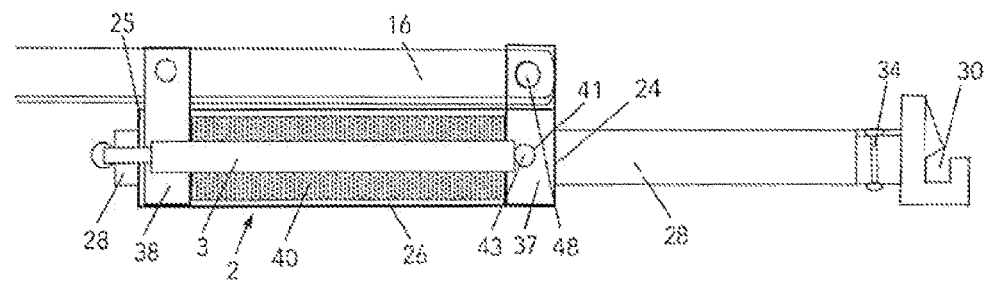
FIGS. 19-22a is another further design style of the implement-actuator. This design uses a cylinder tube with internal slide bearings for the rod to slide against. A linear actuator connects to the rod to control the rod in its extending and contracting movements. The implement-actuator is a double-ended actuator.

FIG. 19 shows a side view the implement-actuator 2 mounted under the bottom-lift-arm 16. The external power-actuator 3 is a single rod-ended actuator. the implement-actuator 3 shows the power-actuator eyelet 43 to power-actuator tie-bar 41 connecting the power-actuator eyelet 43 to the cylinder 26. Also shown is the first mounting hardware 37 and the second mounting hardware 38, the bottom-lift-arm 16 and the bottom-lift-arm connection to the implement 48 now connected to the first mounting hardware 37. The implement-actuator 2 is a double-ended actuator.

Figure 20:
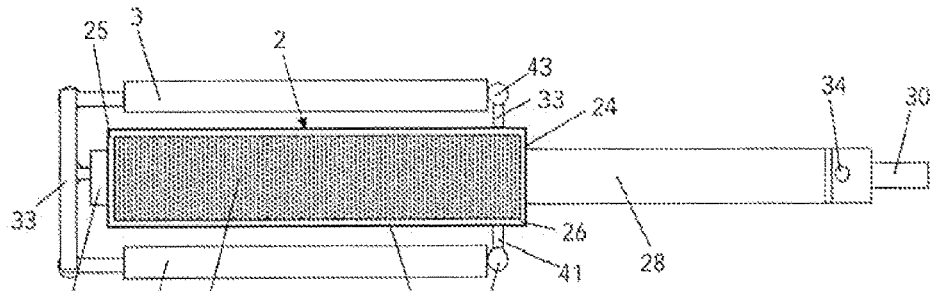

FIG. 20 shows a top view of the implement-actuator 2 with two external power-actuators 3 in the single end configuration. The power-actuators 3 are connected to the cylinder with a power actuator tie-bar 41 at one end at the power-actuator eyelet 43, the power-actuators 3 rods attach to the implement-actuator 2 rod using the rod-tie-bar 33. The design using two power-actuators 3 may be useful wherein a very heavy implement 8 is attached to the three-point hitch 12 (not shown) or if the implement 8 is difficult to pivot. The implement-actuator 2 is shown in the extended position of the rod 28.

Figure 21:
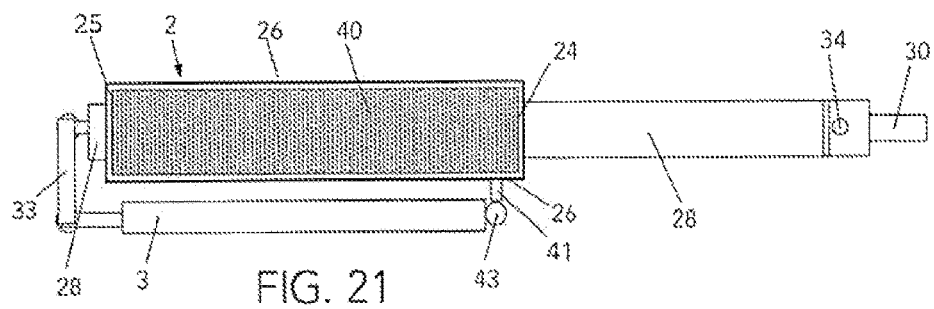

FIG. 21 shows a top view of FIG. 19 in the extended position of the rod 28.

Figure 22:
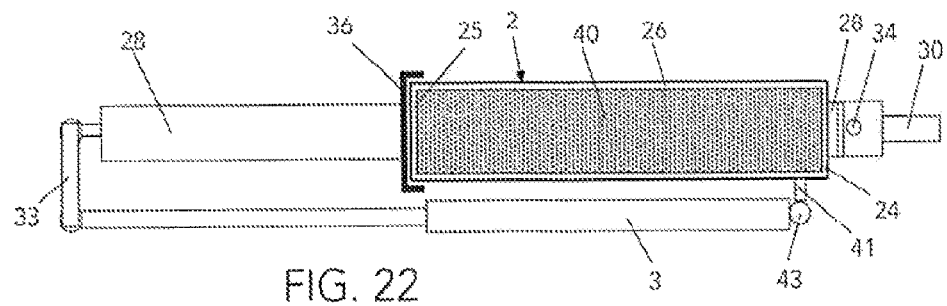

FIG. 22 shows a top view of FIG. 19 in the retracted position of the rod 28. (bottom-lift-arm 16 not shown) Shown is a bearing cap 36 on the second cylinder end 25, the first cylinder end 24 may also be fitted with a bearing cap 36. The bearing cap 36 may assist in stabilizing the position of the bear and retain grease around the bearing is a lubricant is used. Instead of using a lubricant such as grease on the bearing, bearings with Teflon coatings can be used, the Teflon coated bearings can be described as a dry bearing.

Figure 22A:
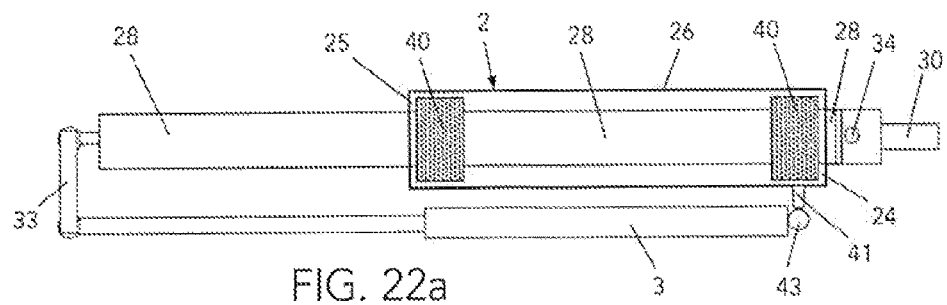

FIG. 22a shows an alternative design of the slide bearings 40 in this design of the implement-actuator 2. The slide bearings 40 in this example are shorter and mounted in the ends of the cylinder. This design of slide bearings 40 may be easier to replace or service while also providing substantial support to the rod 28.

Figure 23:
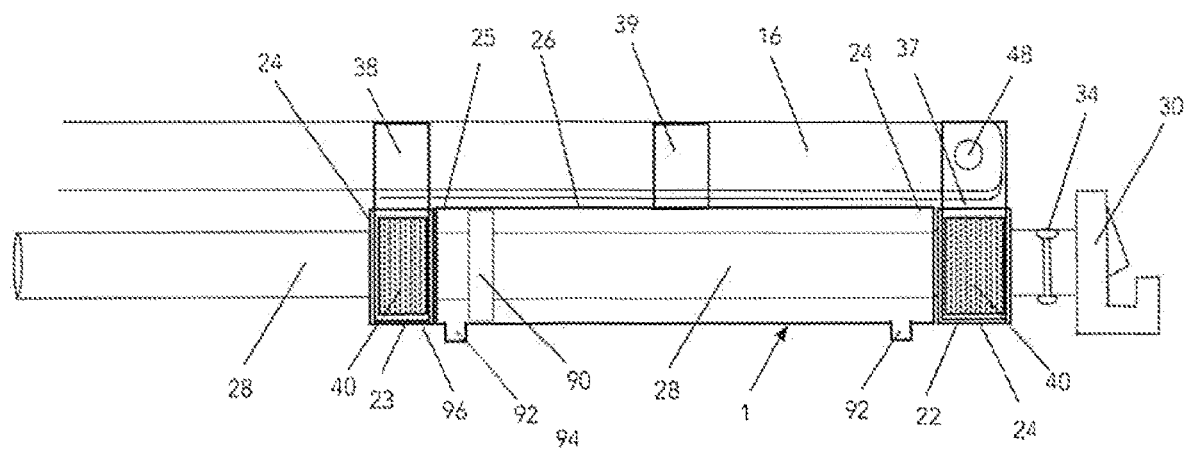
FIG. 23 is a side view of the implement-actuator using a double-ended-rod actuator with sleeves and slide bearings and an enclosure tube enclosing the implement-actuator and the slide bearings to assisting in mounting and holding of the implement-actuator.

FIG. 23 is a side view of the implement-actuator 1 shown as a hydraulic actuator with piston 90 attached to rod 28. implement-actuator 1 is a double-ended-rod actuator with sleeves 22+23 and bearings 40 externally mounted outside of the cylinder 26. A sleeve housing enclosure enclosing the implement-actuator 1 assists in mounting of the implement-actuator 1 to the bottom-lift-arm 16. The sleeve housing attached to the first sleeve and the second sleeve.

FIGS. 24, 25, 26, 27, and 28 are a side view of the double rod-ended implement-actuator 1 with a rectangular rod 29. Shown is the rectangular cylinder 27, the rectangular rod 29. This design also incorporates external mechanical power to move the rod, the mechanical power being a linear hydraulic actuator in either a double rod-ended power-actuator 4 or a single rod-ended power-actuator 3. Inside of the cylinder 27 at the top and the bottom of the cylinder are roller-bearings-and-rack 44, the rack keeping the roller bearing in position. On the sides of the cylinder are slide plate bearings 42 (not shown, see FIG. 36. The implement-actuator 2 is mounted under the bottom-lift-arm 16 while the implement-actuator 2 is held in position on the bottom-lift-arm 16 with the first mounting hardware 37, the second mounting hardware 38, and the third mounting hardware 39. The first cylinder-end 24 is shown and the second cylinder end 25 is shown. The first, second and third mounting hardware is attached to the cylinder 27 with a means such as welding while the first mounting hardware 37 is attached to the bottom-lift-arm 16 implement-attachment-device 48 with a pin or bolt. The double rod-ended power actuator 4 is attached under the implement-actuator 2 with the rod of the power actuator 4 connected to the rod 29 of the implement-actuator. The rod-implement-connection-device 30 is a hook and latch. The double-rod-ended power actuator 4 may have an ease of control advantage over the single-ended-rod power actuator 3. In a single ended hydraulic actuator, each area of the cylinder one each side of the piston 90 are of a different volume of hydraulic fluid than the other area when the rod 28 and the piston 90 are centered in the cylinder 26. The piston 90 rod 28 in a single rod-end actuator is present on one side of the piston 90, but not on the other side, therefore affecting the area of volume on each side of the piston 90. A double ended-rod actuator has a continuous rod 28 extending through both sides of the cylinder 26 on each side of the piston 90, therefore balancing the volume of fluid on each side of the piston 90 of the actuator when the rod 28 and the piston 90 are centered in the cylinder 26. The advantage is noticed if two hydraulic linear actuators are aligned in series as this disclosed invention may utilize for control of the implement-actuators 1+2. The double-ended-rod actuators operate proportionally to each other when aligned in a series relationship, the single-ended-rod actuators do not operate proportionally to each other when aligned in a series relationship and the fluid chambers on each side of the piston 90 are of a different volume of fluid therefore affecting the power and speed movement of the rod. This deficiency of the single-ended-rod actuators can be rectified with special valves controlling the amount of hydraulic fluid in each cylinder chamber on each side of the piston 90.

Figure 24:
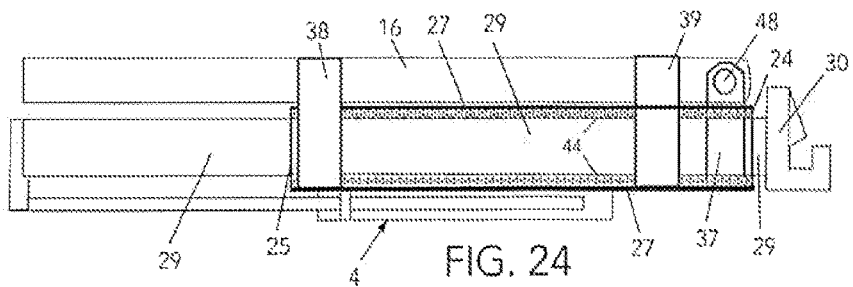
FIGS. 24, 25, 26, 27, and 28 are side views of the implement-actuator 1 with a rectangular rod and a rectangular cylinder.
Figure 25:
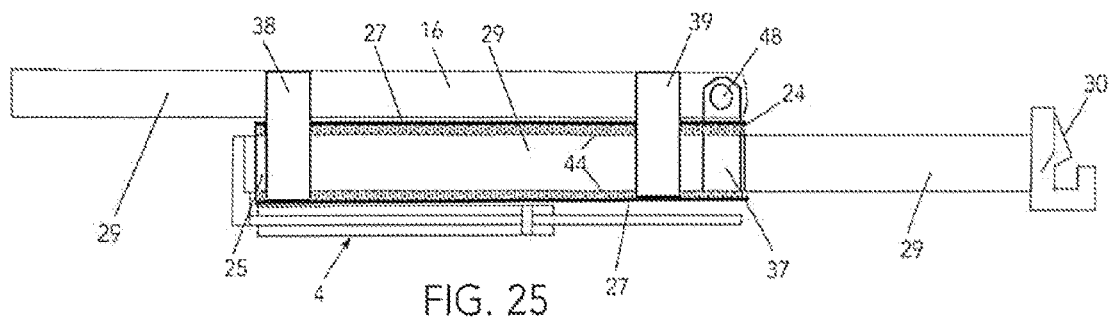

FIG. 25 is the same as FIG. 24 except the rod 29 is in an extended position rather than the retracted position.

Figure 26:
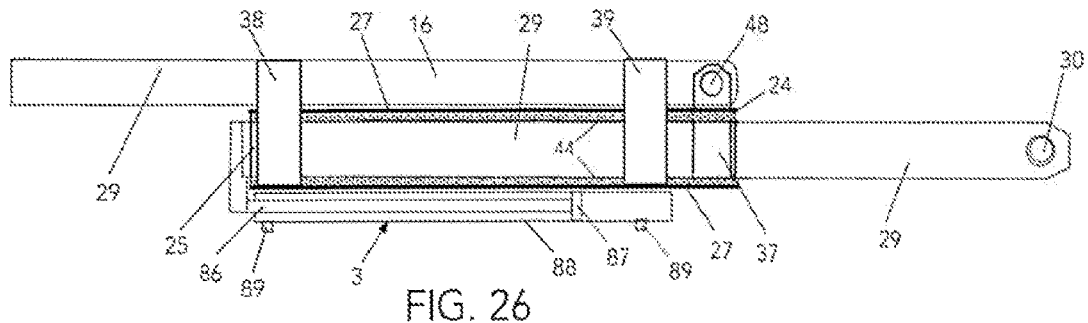

FIG. 26 is similar to FIG. 24 with the exception the power-actuator 3 is single rod-ended instead of double-rod-ended. The rod-implement-connection-device 30 is a pivotal ball instead of a hook and latch.

Figure 27:
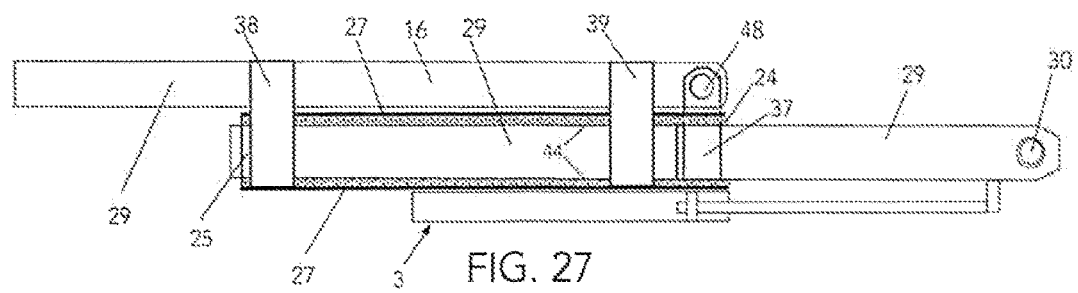

FIG. 27 is similar to FIG. 27 except the power-actuator 3 rod is attached to the rod 29 near the first cylinder-end 24 instead of near the second cylinder-end 25.

Figure 28:
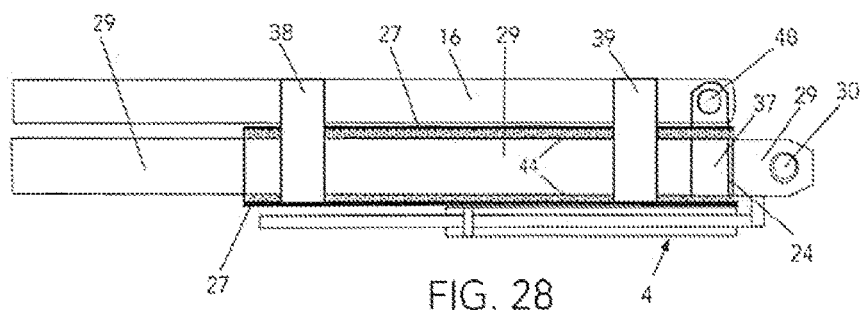

FIG. 28 is similar to FIG. 27 except the power-actuator 4 is a double ended-rod power-actuator instead of a single ended-rod power-actuator 3.

FIG. 29 is a top view of the tractor 6, the disclosed three-point hitch 12 with an attached implement 8 on the front of the tractor and the disclosed three-point hitch 12 with an attached implement 8 on the rear of the tractor. Shown are the front implement center-point 100, the front axle center-point 102, the rear axle center-point 104 and the rear implement center-point 106, resulting in three measurements of the distance of i) the front axle to front implement center 120, ii) tractor wheelbase 122, and iii) the rear axle to rear implement center 124. The three measurements are used in mathematical computations to figure the pivot degrees needed for the front implement and the rear implement to match the pivot point to the tractor 98 as the tractor navigates a turn. The right front wheel angle 110 (19 degrees) and the left front wheel angle 112 (21 degrees) are shown as the tractor is turning, the average of the right front wheel angle 110 and the left front wheel angle 112 equals the pivot degrees of the front axle angle line 108 (20 degrees). The intersection of the rear axle aligned line 116 (0 degrees), and the front axle center-point turning angle 114 line is the tractor pivot-point 98.

After the tractor pivot-point 98 is known, the pivot degrees of each of the front implement 8 and the rear implement 8 can be determined to allow each of the implements 8+8 to pivot on the same pivot point as the tractor 6, therefore allowing each implement 8+8 to navigate the turn with a proper degrees of pivot to match the tractor pivot-point 98, therefore, keeping each implements center-point 100+106 on the same forward moving path as the tractor 6 front and rear axle center-points 102+104, therefore eliminating unanticipated side load stress on each implement 8+8 and allowing each implement 8+8 to operate within its intended purpose of forward motion working operation in a straight line or during turns without generating side load stress. See previous paragraphs in the summary of the invention for the formulas to determine the front implement angle 108 and the rear implement angle 110 at a particular turning degrees of the tractor 6 front axle center-point turning angle 114. The controller 68 makes the adjustments of the disclosed three-point hitch 12 implement-actuators 1 to gain the proper front implement angle 108 and the proper rear implement angle 118 while the tractor 6 is navigating turns of various degrees of angle. A steering position sensor 85 senses the angle of turn of each front wheel and communicates with the controller 68, if desired, the controller adjusting the pivot angle of the implements 8+8 to match the pivot turning angle of the tractor, the controller communicating with the steering control device 84 for automated steering of the tractor.

Figure 30:
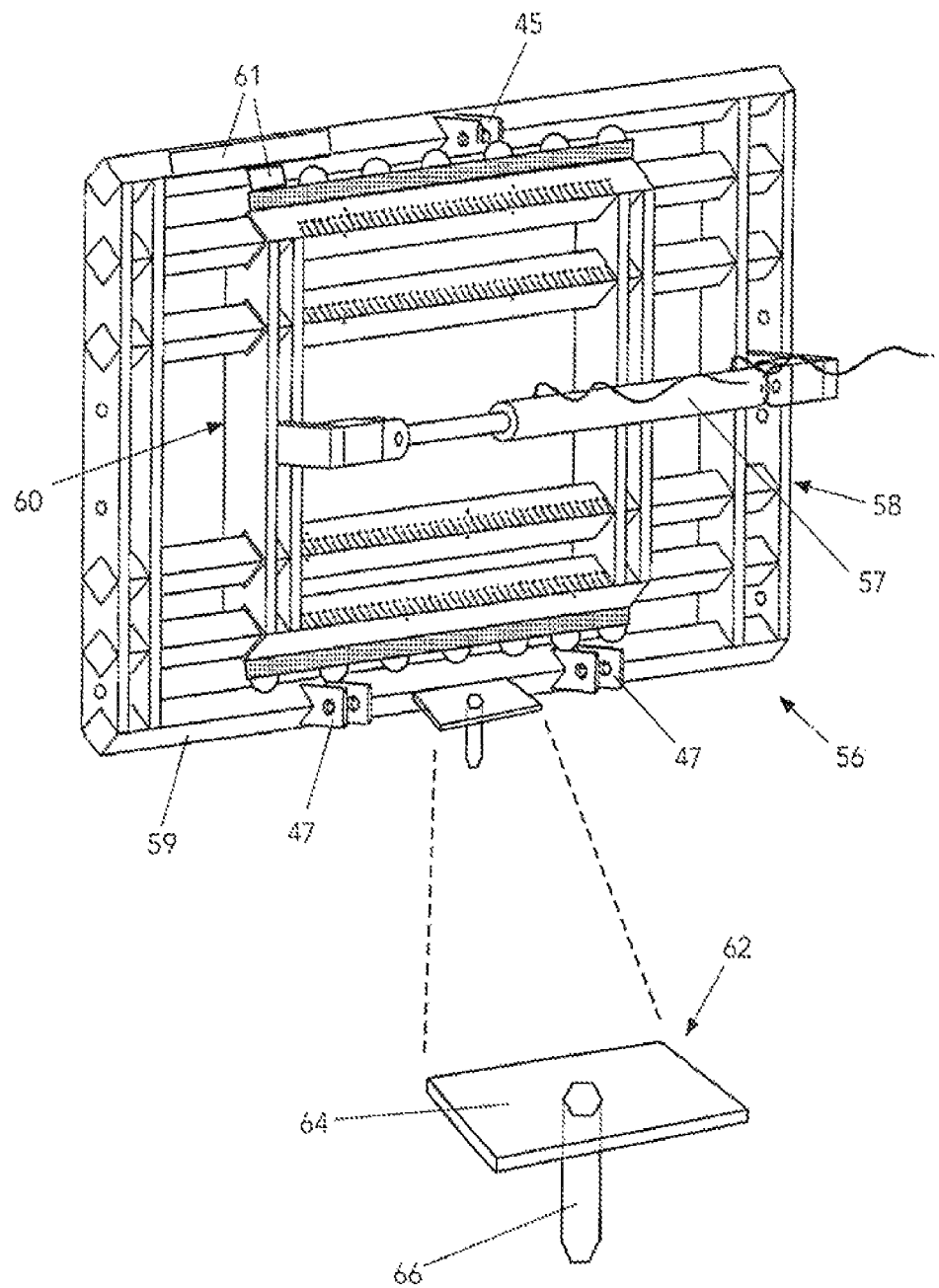
FIG. 30 is a perspective view of the tractor facing side of the apparatus similar showing an added pivoting coupling on the drawbar.

FIG. 30 is a perspective view of the tractor facing side of the side-shifting-sliding implement attachment apparatus 56 showing the relationship sensors 61, an added pivoting coupling 62 (see FIG. 31), support plate 64 with pin 66 engages the tractor drawbar hole 19, therefore, the coupling 62 resting on the drawbar 17 and adding vertical support to the side-shifting implement attachment apparatus 56 (see FIGS. 31 and 32) improving the supporting ability of the apparatus 56 while also relieving stress on the tractor three-point hitch 12 bottom-lift-arms 16, in effect transferring a particular amount of vertical load to the drawbar 17 (see FIG. 32) during the use of heavy loads and navigating stressful turning angles. The pivoting coupling 62 with pin 66 in effect, extends the tractor mounted drawbar 17 (see FIG. 32) to the first framework 58 lower cross beam 59 of the apparatus 56 thereby preventing or diminishing a horizontal twisting action that would provide stress on the three-point hitch 12 and especially on the implement-actuators 1+1 (see FIG. 32). The coupling 62 can be rigidly attached to the first framework 58 lower cross beam 59 with an attachment method such as welding or clamping. Pin 66 can be attached to the plate 64 by installing the pin 66 through a hole in the plate 64 and temporarily or permanently securing in place, or in the alternative, welding the pins directly to the plate 64. The pin 66 is to maintain a secured connection to the tractor 6 mounted drawbar 17 (see FIG. 32) unless a strong force is applied upwards to release the pin 66 from the drawbar 17 (see FIG. 32), in such an instance such as the three point hitched is raised to remove the pin 66 from the drawbar 17 (see FIG. 32), the release of the pin 66 from the drawbar 17 will prevent the rising force of the apparatus 56 from bending the tractor 6 drawbar 17 while the three-point hitch 12 raises the apparatus 56. The relationship sensors 61 measure the position relationship between the slidable second framework 60 and the first framework 58 of the side-shifting implement attachment apparatus 56. The slidable second framework 60 represents the position of the attached implement 8 and the first framework 58 represents the position of the tractor 6.

Figure 31:
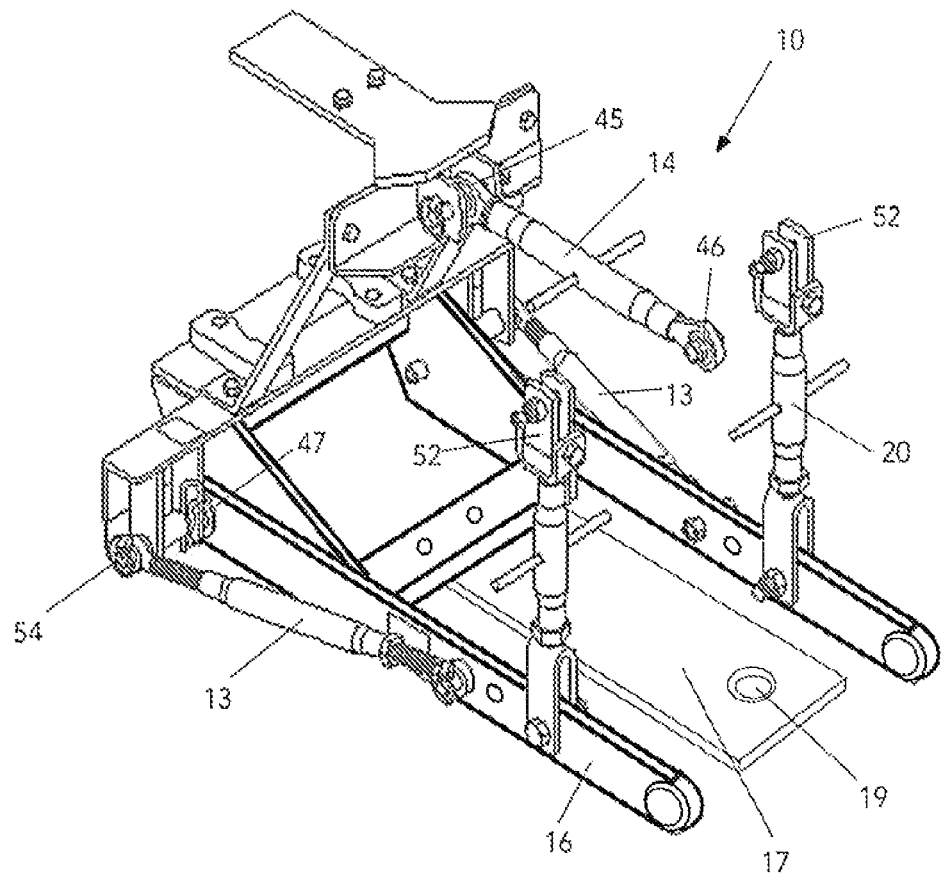
FIG. 31 is a perspective view showing a prior art three-point hitch arrangement with its various parts attached including a tractor mounted drawbar.
Figure 32:
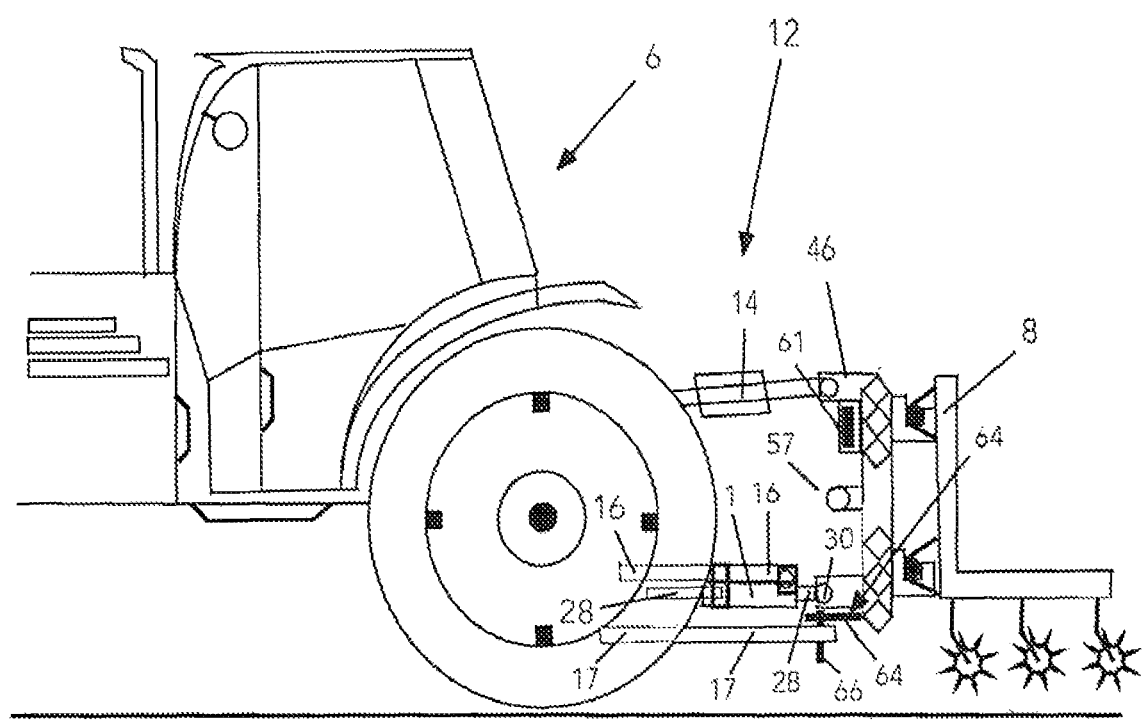
FIG. 32 is a side view of a tractor, the disclosed three-point hitch and a connected side-shifting implement attachment apparatus with an attached implement. Showing the coupling plate and pin.

FIG. 31 is a perspective view showing a prior art three-point hitch arrangement with its various parts attached including a tractor mounted drawbar 17 designed for supporting an implement 8 (see FIG. 32). The drawbar 17 displayed in this drawing is a relatively wide drawbar in the general width of around six inches. Many tractor-mounted drawbars 17 are generally in the width of around three to six inches. The drawbar 17 is usually removably secured to the tractor undercarriage usually with bolting hardware. Top link arm 14 is shown along with two bottom link lift arms 16+16 to complete the three points of the three-point hitch. Draw bar hole 19 in the end of the drawbar 17 is available to hookup an implement or in this case of the present invention, to hookup to the support coupling 62 (see FIG. 30) that in effect, extends the drawbar to the apparatus 56 (see FIG. 30) first framework 59 (see FIG. 30).

FIG. 32 is a side view of a tractor 6, the disclosed three-point hitch 12 and a connected side-shifting implement attachment apparatus 56 with an attached implement 8. Showing the coupling 62, plate 64, and pin 66. Plate 64 is attached to the side-shifting implement attachment apparatus 56 lower crossbeam 59, (see FIG. 30) and shown with pin 66 attached to the plate 64, the pin 66 removably protruding through the tractor drawbar 17 hole 19 (see FIG. 31).

Figure 33:
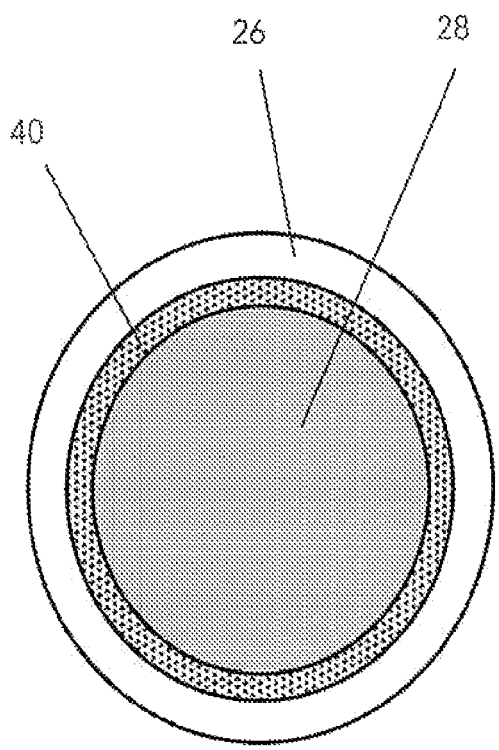
FIG. 33 is an end cutout view of the cylinder-round with a slide bearing inside of the cylinder, the rod-round is inserted into the slide bearing and cylinder.

FIG. 33 is an end cutout view of the cylinder-round 26 with a slide bearing 40 inside of the cylinder 26, the rod-round 28 is inserted into the slide bearing 40 and cylinder 26. The bearing is circular in shape.

Figure 34:
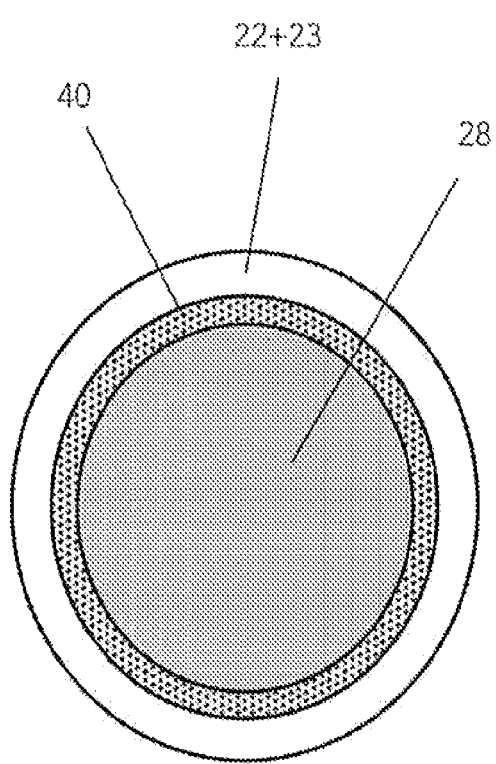
FIG. 34 is an end cutout view of the first sleeve and the second sleeve with a slide bearing inside of the sleeve, the rod-round is inserted into the slide bearing and cylinder.

FIG. 34 is an end cutout view of the first sleeve 22 and the second sleeve 23 with a slide bearing 40 inside of the sleeve 22+23, the rod-round 28 is inserted into the slide bearing 40 and cylinder 26. The bearing is circular in shape.

Figure 35:
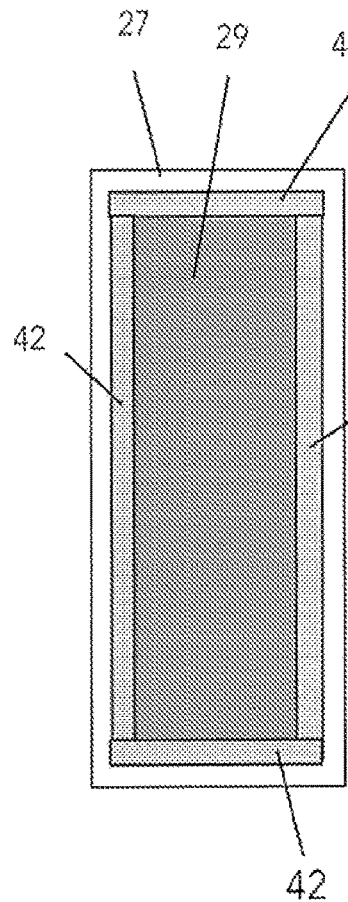
FIG. 35 is an end cutout view of the cylinder-rectangular with a slide bearings plates along the top, bottom, and sides of the cylinder-rectangular, the rod-rectangular is inserted into the slide bearings plates and cylinder-rectangular.

FIG. 35 is an end cutout view of the cylinder-rectangular 27 with a slide bearings plates 42 along the top, bottom, and sides of the cylinder-rectangular 27, the rod-rectangular 29 is inserted into the slide bearing plates 42 and cylinder-rectangular 27.

Figure 36:
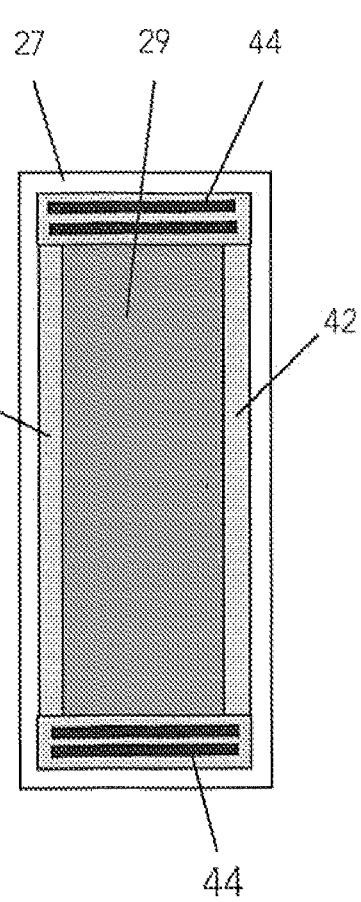
FIG. 36 is an end cutout view of the cylinder-rectangular with a slide bearings plates along the sides of the cylinder-rectangular, and roller-bearings-and-rack are at the top and bottom of the rod-rectangular.

FIG. 36 is an end cutout view of the cylinder-rectangular 27 with a slide bearings plates 42 along the sides of the cylinder-rectangular 27, and roller-bearings-and-rack are at the top and bottom of the rod-rectangular 29.

Figure 36A:
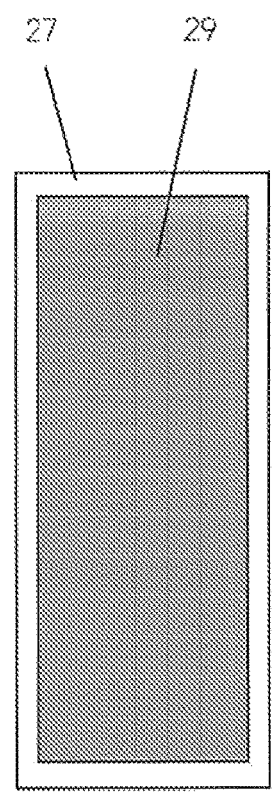
FIG. 36a is an end cutout view of the cylinder-rectangular with cylinder and rod and no slide bearing.

FIG. 36a is an end cutout view of the cylinder-rectangular 27 without a slide bearing 40 or roller bearing 44 installed. (see also FIG. 39)

Figure 37:
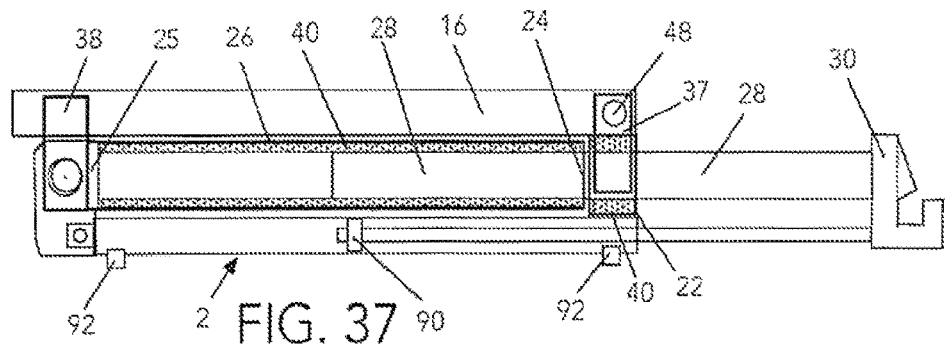
FIGS. 37-39 are single ended externally powered implement-actuators with options on the external power-actuator. The cylinder of each implement-actuator is attached at the second cylinder-end while the first cylinder-end is unattached.
Figure 38:
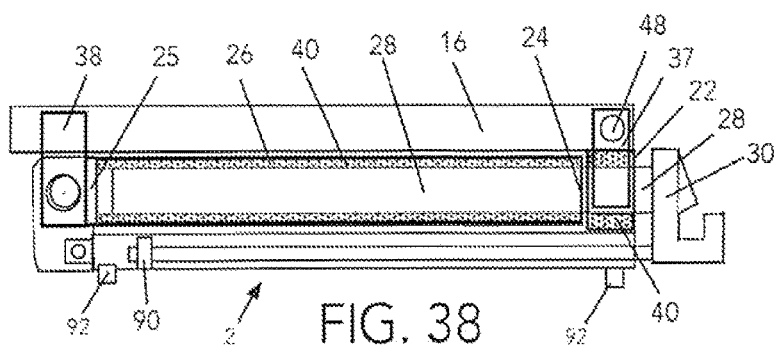
Figure 39:
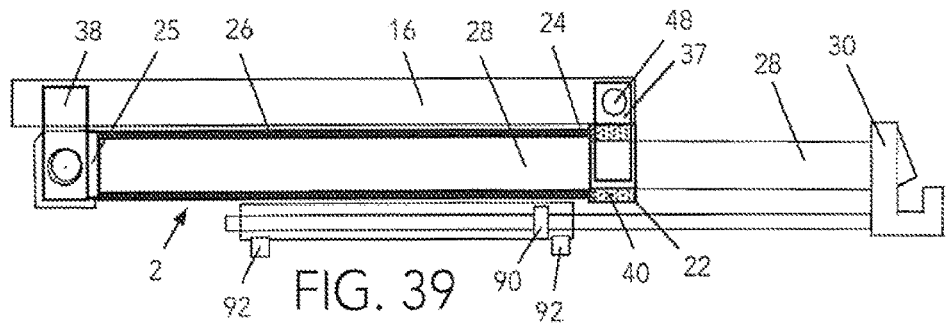

FIGS. 37-39 are single ended externally powered implement-actuators with options on the external power-actuator 3+4 in either s single-ended design or a double-ended design. The double-ended power-actuator 4 maintains equal cylinder volumes on each side of the piston 90, possibly allowing more economical control options when compared top the singe-ended power-actuator 3. FIG. 37 and FIG. 38 are the same implement-actuator shown the extended and retracted position of the rod. The cylinder 26 of each implement-actuator 2 is attached at the second cylinder-end while the first cylinder-end 24 is unattached. The rod 28 is supported by the first sleeve 22 and bearing 40 and in effect, the rod 28 supports the first cylinder-end 24. The first sleeve 22 and bearing 40 relieves the first-cylinder-end of load forces. The first mounting hardware 37 attached the first sleeve to the bottom-lift-arm 16 implement-connection device 48.

FIG. 39 shows the implement-actuator 2 with a double ended power-actuator 4 and is shown with the cylinder 26 and the rod 28 next to each other with no slide bearing 40 installed. This configuration allows a larger diameter rod 28 as opposed when a slide bearing 40 is installed assuming the cylinder 26 inside diameter is similar with the slide bearing 40 installed cylinder 26. This configuration would most likely require constant lubrication between the cylinder 25 and the rod 28 and in addition, a chrome plated rod 28 and the inside of the cylinder 26 being chrome plated would extend the life of the implement-actuator.

Figure 40:
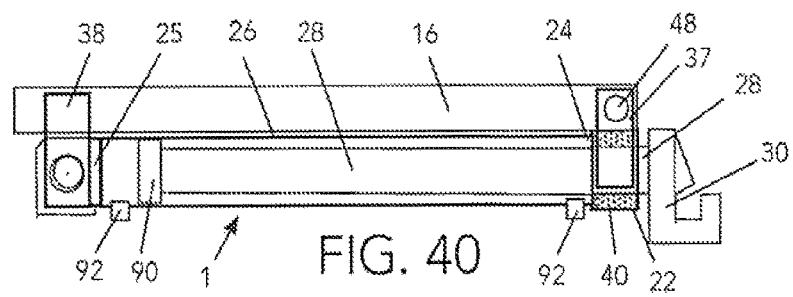
FIGS. 40-41 are single ended internally powered implement-actuators shown in the retracted position and the extended position. The cylinder of each implement-actuator is attached at the second cylinder-end while the first cylinder-end is unattached.
Figure 41:
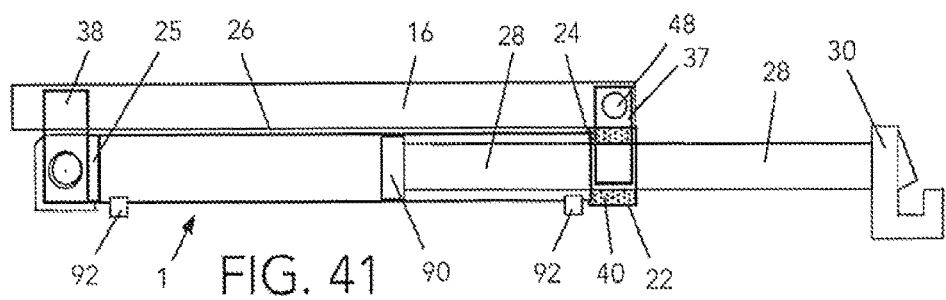

FIGS. 40-41 are single ended internally powered implement-actuators shown in the retracted position and the extended position. The cylinder 26 of each implement-actuator 2 is attached at the second cylinder-end while the first cylinder-end 24 is unattached. The rod 28 is supported by the first sleeve 22 and bearing 40 and in effect, the rod 28 supports the first cylinder-end 24. The first sleeve 22 and bearing 40 relieves the first-cylinder-end of load forces. The first mounting hardware 37 attached the first sleeve to the bottom-lift-arm 16 implement-connection device 48.

The foregoing summary and detailed description of the invention is given primarily for clearness of understanding and no unnecessary limitations are to be understood therefrom, for modification will become obvious to those skilled in the art upon reading this disclosure and may be made without departing from the spirit of the invention and scope of the appended claims. For example, additional variations of the linear actuators may be used to accomplish the same result. Accordingly, this invention is not intended to be limited by the specific exemplification presented herein above. Rather, what is intended to be covered is within the spirit and scope of the appended claims.

The invention claimed is:

1. A three-point hitch of mobile machinery such as an agricultural or excavating tractor, the three-point hitch comprising:
  a) three arms connectable to an implement, the three arms comprising:
    i) a top-link-arm;
    ii) two bottom-lift-arms;
    each of the three arms pivotally attached to the tractor at one end, the opposing end of each of the three arms comprising an implement-connection-device configured to connect to the implement, the bottom-lift-arms laterally spaced apart and attached in a lower horizontal plane at the tractor, the top-link-arm attached in a higher horizontal plane at the tractor and located in a vertical plane between the two bottom-lift-arms;
  b) at least one implement-actuator attached to each bottom-lift-arm, each implement-actuator comprising:
    i) a dual action linear actuator having a cylinder tube and a rod, the cylinder having a first cylinder-end and a second cylinder-end, the rod having a first rod-end and a second rod-end, the first rod-end protrudes out of the first cylinder-end, the first rod-end comprises a rod-implement-connection-device, the rod-implement-connection-device configured to releasably connect to the implement, the rod-implement-connection-device supplants the implement-connection-device of the corresponding bottom-lift-arm, the bottom-lift-arm implement-connection-device is no longer used for a connection to the implement, the bottom-lift-arm implement-connection-device connects to the implement-actuator, the implement-actuator implement-connection-device is now the connection to the implement, enabling movement of the implement by the implement-actuator;
    the first rod-end extends away from the cylinder in the direction of the implement and retracts towards the cylinder;
    the first cylinder-end is located proximate to the rod-implement-connection-device, and the second cylinder-end is at the opposing end of the cylinder;
    the rod-implement-connection-device enables a pivotal connection to the implement; and
    each implement-actuator is suitable to be controlled with a power source.

2. The three-point hitch of claim 1 wherein the rod is a double-ended continuous rod, the first rod-end protrudes out of the first cylinder-end in an extending motion and the second rod-end protrudes out of the second cylinder-end in an extending motion, the first rod-end and the second rod-end extends and retracts inversely to each other, the second rod-end extends away from the cylinder in the direction of the tractor and retracts towards the cylinder.

3. The three-point hitch of claim 1 wherein the second cylinder-end is attached along the corresponding bottom-lift-arm towards the tractor, the first cylinder-end is unattached and supported by the rod, the rod being supported by a first sleeve and a bearing, the first sleeve and the bearing surrounding the rod, the first sleeve attached to the corresponding bottom-lift-arm implement-connection-device.

4. The three-point hitch of claim 2 wherein the second cylinder-end is unattached and supported by the rod, the first cylinder-end is unattached and supported by the rod, the first rod-end being supported by a first sleeve and a bearing, the first sleeve and the bearing surrounding the rod, the first sleeve attached to the corresponding bottom-lift-arm implement-connection-device, the second rod-end being supported by a second sleeve and a bearing, the second sleeve and the bearing surrounding the rod, the second sleeve attached along the corresponding bottom-lift-arm towards the tractor.

5. The three-point hitch of claim 4 comprising a housing attached to the first sleeve and the second sleeve.

6. The three-point hitch of claim 1 wherein the power source provided to each implement-actuator is pressurized hydraulic fluid and each implement-actuator is a hydraulic linear actuator.

7. The three-point hitch of claim 1 wherein the power source provided to each implement-actuator is electricity and each implement-actuator is an electric linear actuator.

8. The three-point hitch of claim 1 wherein the power source provided to each implement-actuator is mechanical power, the mechanical power being supplied by a hydraulic linear actuator attached to the implement-actuator rod.

9. The three-point hitch of claim 8 wherein the hydraulic linear actuator is a single ended linear actuator with the rod protruding out of one end of the cylinder.

10. The three-point hitch of claim 8 wherein the hydraulic linear actuator is a double ended linear actuator with the rod protruding out of both ends of the cylinder.

11. The three-point hitch of claim 1 wherein the power source provided to each implement-actuator is mechanical power, the mechanical power being supplied by an electric linear actuator attached to the implement-actuator rod.

12. The three-point hitch of claim 1 comprising bearings located inside the cylinder between the cylinder and the rod.

13. The three-point hitch of claim 12 wherein the bearings are circular slide-bearings.

14. The three-point hitch of claim 12 wherein the bearings are plate slide-bearings.

15. The three-point hitch of claim 12 wherein the bearing are roller bearings.

16. The three-point hitch of claim 1 wherein each implement-actuator is attached under the bottom-lift arm.

17. The three-point hitch of claim 1 wherein each implement-actuator is attached on top of the bottom-lift arm.

18. The three-point hitch of claim 1 wherein two implement-actuators are attached on each bottom-lift-arm, one implement-actuator mounted on top of each bottom-lift-arm and one implement-actuator mounted under each bottom-lift-arm.

19. The three-point hitch of claim 1 wherein the implement-actuators are removably attached to the bottom-lift-arms.

20. The three-point hitch of claim 1 comprising power controls or instruments causing the implement-actuators to move simultaneously, proportionally and inversely to each other, resulting in a pivoting of the implement on a vertical axis and creating the actions of:
   i) the implement remaining generally plumb and level during the pivot of the implement while the length of the top-link-arm remains constant; and
   ii) each implement-actuator having a starting point of neutral before the pivoting begins, the neutral point being wherein the rod is extended to a point of fifty percent of the usable extension length of each implement-actuator.

21. The three-point hitch of claim 1 where each implement-actuator can be controlled separately and independently.

22. A three-point hitch of mobile machinery such as an agricultural or excavating tractor, the three-point hitch comprising:
   a) three arms connectable to an implement, the three arms comprising:
      i) an adjustable top-link-arm;
      ii) two bottom-lift-arms;
      each of the three arms pivotally attached to the tractor at one end, the opposing end of each of the three arms comprising an implement-connection-device configured to connect to the implement, the bottom-lift-arms laterally spaced apart and attached in a lower horizontal plane at the tractor, the top-link-arm attached in a higher horizontal plane at the tractor and located in a vertical plane between the two bottom-lift-arms;
   b) two top-lift-arms;
   c) two lift-link-arms connected between the two top-lift-arms and the bottom-lift-arms;
   d) at least one top-lift-arm-actuator comprising a single action hydraulic actuator raising and lowering the two top-lift-arms, in effect raising and lowering the bottom-lift-arms;
   e) at least one implement-actuator attached to each bottom-lift-arm, each implement-actuator comprising:
      i) a dual action linear actuator having a cylinder tube and a rod, the cylinder having a first cylinder-end and a second cylinder-end, the rod having a first rod-end and a second rod-end, the first rod-end protrudes out of the first cylinder-end, the first rod-end comprises a rod-implement-connection-device, the rod-implement-connection-device configured to releasably connect to the implement, the rod-implement-connection-device supplants the implement-connection-device of the corresponding bottom-lift-arm, the bottom-lift-arm implement-connection-device is no longer used for a connection to the implement, the bottom-lift-arm implement-connection-device connects to the implement-actuator, the implement-actuator implement-connection-device is now the connection to the implement, enabling movement of the implement by the implement-actuator;
      the first rod-end extends away from the cylinder in the direction of the implement and retracts towards the cylinder;
      the first cylinder-end is located proximate to the rod-implement-connection-device, and the second cylinder-end is at the opposing end of the cylinder;
      each rod-implement-connection-device enables a pivotal connection to the implement; and
      each implement-actuator is suitable to be controlled with a power source.

23. A system comprising:
   a) a mobile machinery such as an agricultural or excavation tractor;
   b) the three-point hitch of claim 1 attached to the rear of the tractor;
   c) the three-point hitch of claim 1 attached to the front of the tractor;
   d) an implement attached to each three-point hitch;
   e) the tractor comprises steering position sensors on each front wheel, the steering position sensors communicating with a controller; and
   f) the controller controls the implement-actuators according to the steering position sensors.

24. The system of claim 23 further comprising:
   a) an automated steering device to steer the tractor;
   b) a side-shifting-sliding implement attachment device attached to each three-point hitch and the implement;
   c) each side-shifting-sliding implement attachment device comprises relationship sensors measuring the relationship of the position of the slidable second framework and the position of the first framework;
   d) two signal receivers attached to each implement, the signal receivers aligned in a separated linear alignment and aligned with the implement centerline; and
   the controller communicating with a position monitors system to control the position of the slidable second framework of the a side-shifting-sliding implement attachment device, the controller controlling the positions of the implement-actuators rods, and controlling the position of the tractor.

25. The system of claim 24 wherein the signal receivers are GPS receivers.

26. The system of claim 23 wherein the signal receivers are laser receivers.

27. The three-point hitch of claim 22 further comprising:
a) a hydraulic accessory valve and activation switch configured to intercept the hydraulic fluid supplying the top-lift-arm-actuator and return the pressurized hydraulic fluid back to a fluid reserve tank when the accessory valve is activated, the hydraulic fluid will flow freely through the hydraulic accessory valve to the top-lift-arm-actuator when the accessory valve is not activated;
b) each implement-actuator having a extension sensor sensing an extension of the implement-actuator rod;
c) the extension sensor communicating with the hydraulic accessory valve to activate the hydraulic accessory valve when the extension sensor senses an extension of the implement-actuator rod, therefore intercepting the supply of pressurized hydraulic fluid to the top-lift-arm-actuator, therefore preventing the bottom-lift-arms and the implement-actuators from applying upwards force to lift an attached implement; and
d) a manual switch to enable or disable the activation of the hydraulic accessory valve.

28. The three-point hitch of claim 27 additionally further comprising a stress sensor on each implement-actuator to automatically activate the hydraulic accessory valve when the stress sensor senses the implement-actuator is approaching or reaches its stress limit.

* * * * *